Dec. 14, 1926.

F. ASHWORTH 1,610,235

ART OF MAKING HEELS

Filed Sept. 8, 1923     15 Sheets-Sheet 3

INVENTOR.
Fred Ashworth

Dec. 14, 1926.

F. ASHWORTH 1,610,235

ART OF MAKING HEELS

Filed Sept. 8, 1923    15 Sheets-Sheet 4

Fig. 4.

INVENTOR
Fred Ashworth

Dec. 14, 1926.

F. ASHWORTH 1,610,235

ART OF MAKING HEELS

Filed Sept. 8, 1923    15 Sheets-Sheet 10

INVENTOR
Fred Ashworth

Dec. 14, 1926.　　　　　　　　　　　　　　　　1,610,235
F. ASHWORTH
ART OF MAKING HEELS
Filed Sept. 8, 1923　　　15 Sheets-Sheet 13

INVENTOR
Fred Ashworth

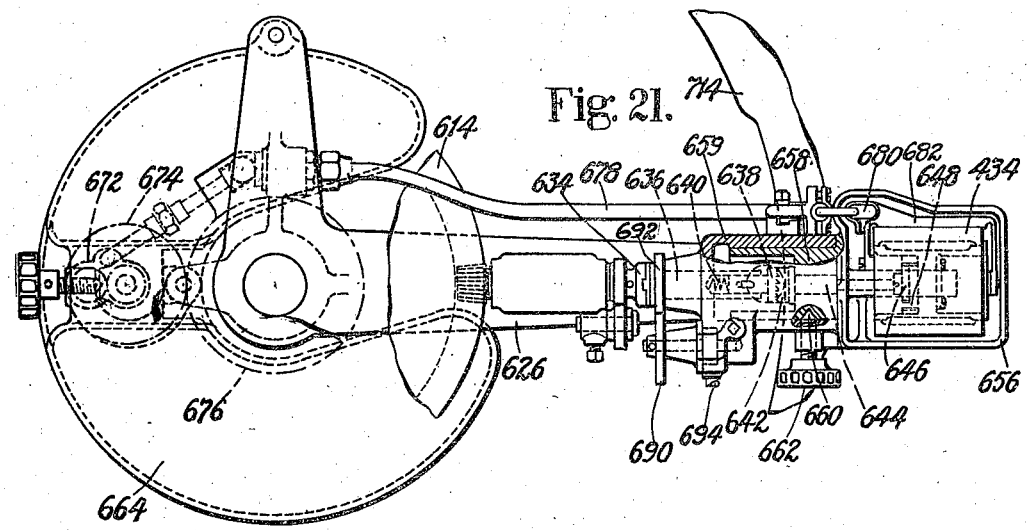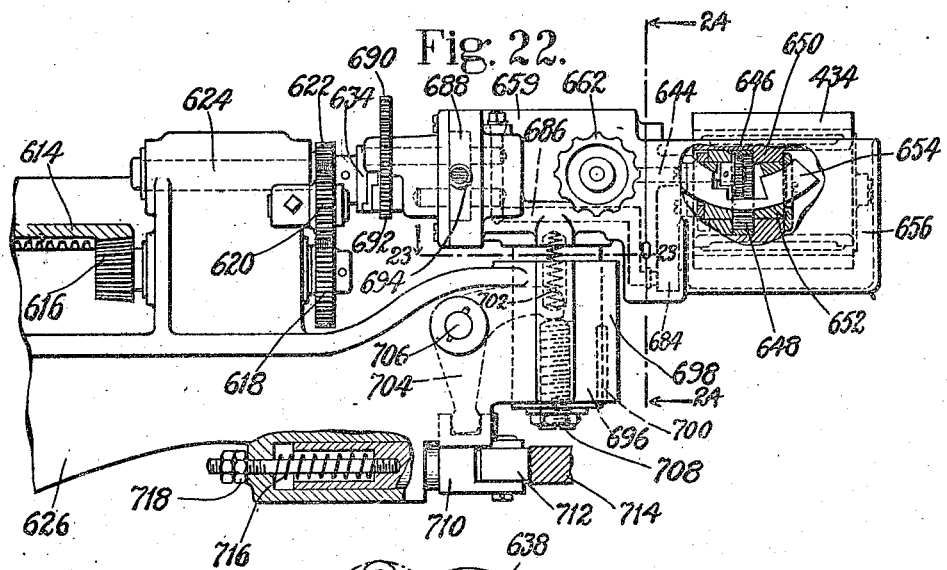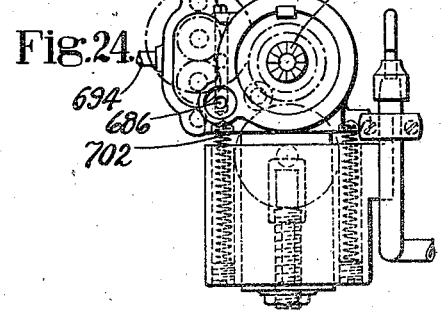

Patented Dec. 14, 1926.

1,610,235

UNITED STATES PATENT OFFICE.

FRED ASHWORTH, OF WENHAM, MASSACHUSETTS, ASSIGNOR TO UNITED SHOE MACHINERY CORPORATION, OF PATERSON, NEW JERSEY, A CORPORATION OF NEW JERSEY.

ART OF MAKING HEELS.

Application filed September 8, 1923. Serial No. 661,727.

This invention relates to the art of making heels, and includes both a novel machine and a novel method, applicable to the manufacture of heels for boots and shoes.

It is the object of the invention to provide an improved method and machine which shall make it commercially practicable to produce in quantity heels of superior quality and accuracy, with a higher degree of efficiency and economy than has heretofore been realized in heel factory practice.

The invention has many valuable features all of which cooperate in the attainment of the above stated object but it should be understood that certain features of the invention are useful in other connections than the specific machine herein illustrated.

The illustrated machine is a completely automatic heel building machine operated by power to assemble pasted lifts, secure them together, and hold the heels under pressure for a sufficient time to permit the paste to set.

For the best results it is preferred to employ a series of individual presses, and a feature of the invention resides in the combination with such a series of presses of power operated means for assembling lifts directly into the presses to form heel piles therein. By the elimination of all transfers of the heel piles from assembling mechanism to presses the danger of losing control of one or more lifts of a pile is minimized and a maximum speed of production is secured.

An improved method of making lift heels is also provided, according to which a plurality of lifts are assembled, the assemblage is subjected to pressure, a nail is driven through the lifts and the pressure upon the assemblage is then increased.

Another feature of the invention, contributing to accuracy and certainty in the automatic assembly of lifts into heel piles of the desired form, consists in the provision of an impaling tool mounted upon a carrier movable successively into cooperative relation to a plurality of sources of lift supply, in combination with means for assembling lifts from the sources of supply upon the impaling tool. It is impossible for lifts thus assembled to become disarranged, since they are under positive control at all times. The carrier may conveniently be one of the individual presses previously mentioned, in which event the pile of assembled lifts may remain upon the impaling tool until after the heel has been clamped under pressure.

In this connection the invention provides an improved method of heel building which comprises assembling a plurality of lifts upon an impaling tool, removing the assemblage of lifts from the tool, and inserting a fastening, for example a heel building nail, in the hole left by the tool.

The invention further provides an improved heel pressing mechanism in the form of an intermittently movable series of individual heel presses combined with means acting upon the presses while they are stationary to cause them to apply pressure to the heels contained therein. In the illustrated machine a toggle type of press is used, and, by operating such a press by external means while it is stationary, a maximum pressure at a minimum expense of power is secured.

The above and various other features of improvement contributing to speed and economy of operation and superiority of product will best be understood and appreciated from reading the following detailed description of one embodiment of the invention, in connection with the accompanying drawings, in which Fig. 1 is a plan view of the front, right-hand portion of the machine;

Figure 1:
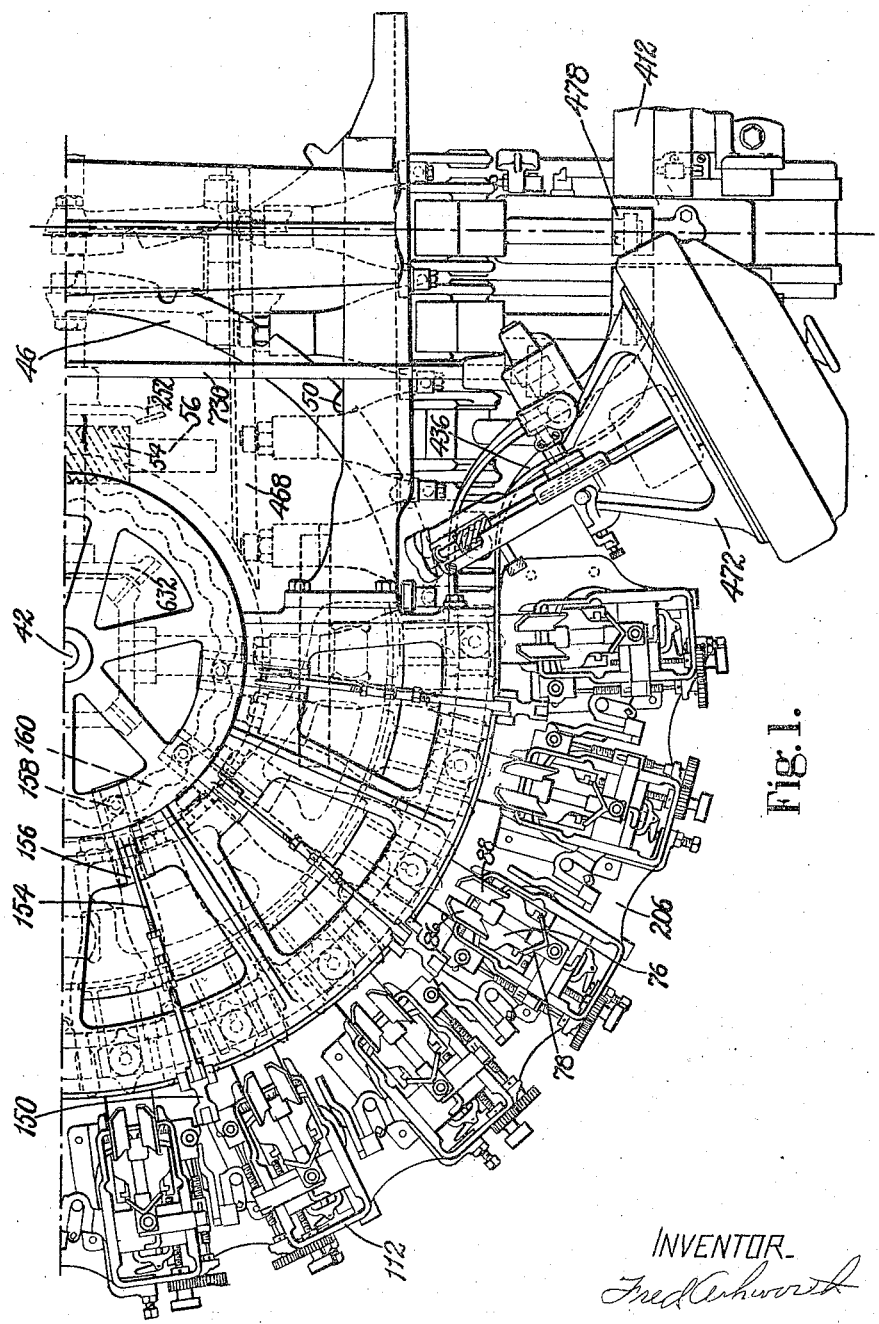
Figure 2:
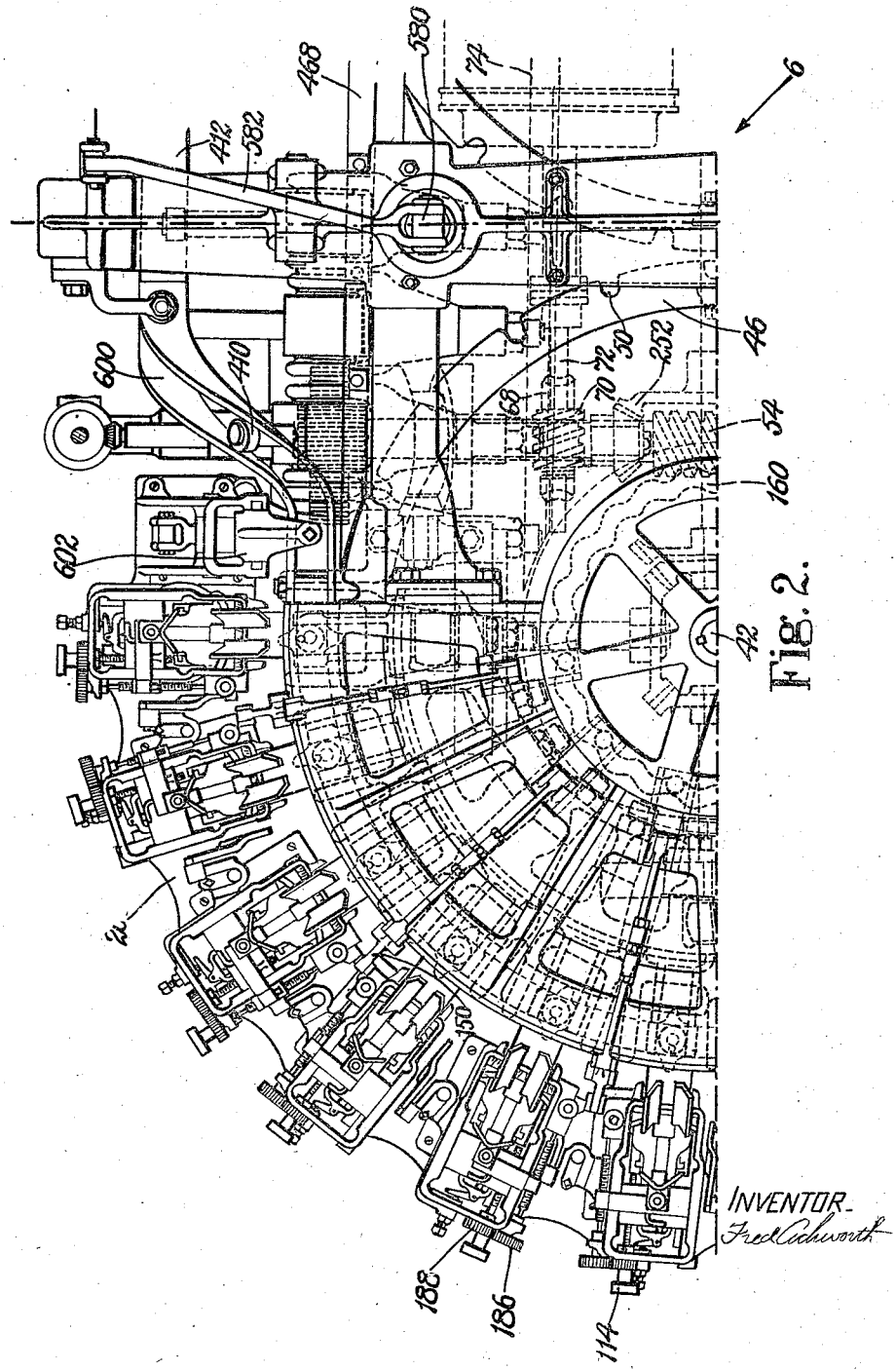
Fig. 2 is a plan view of the front, left-hand portion of the machine.
Figure 3:
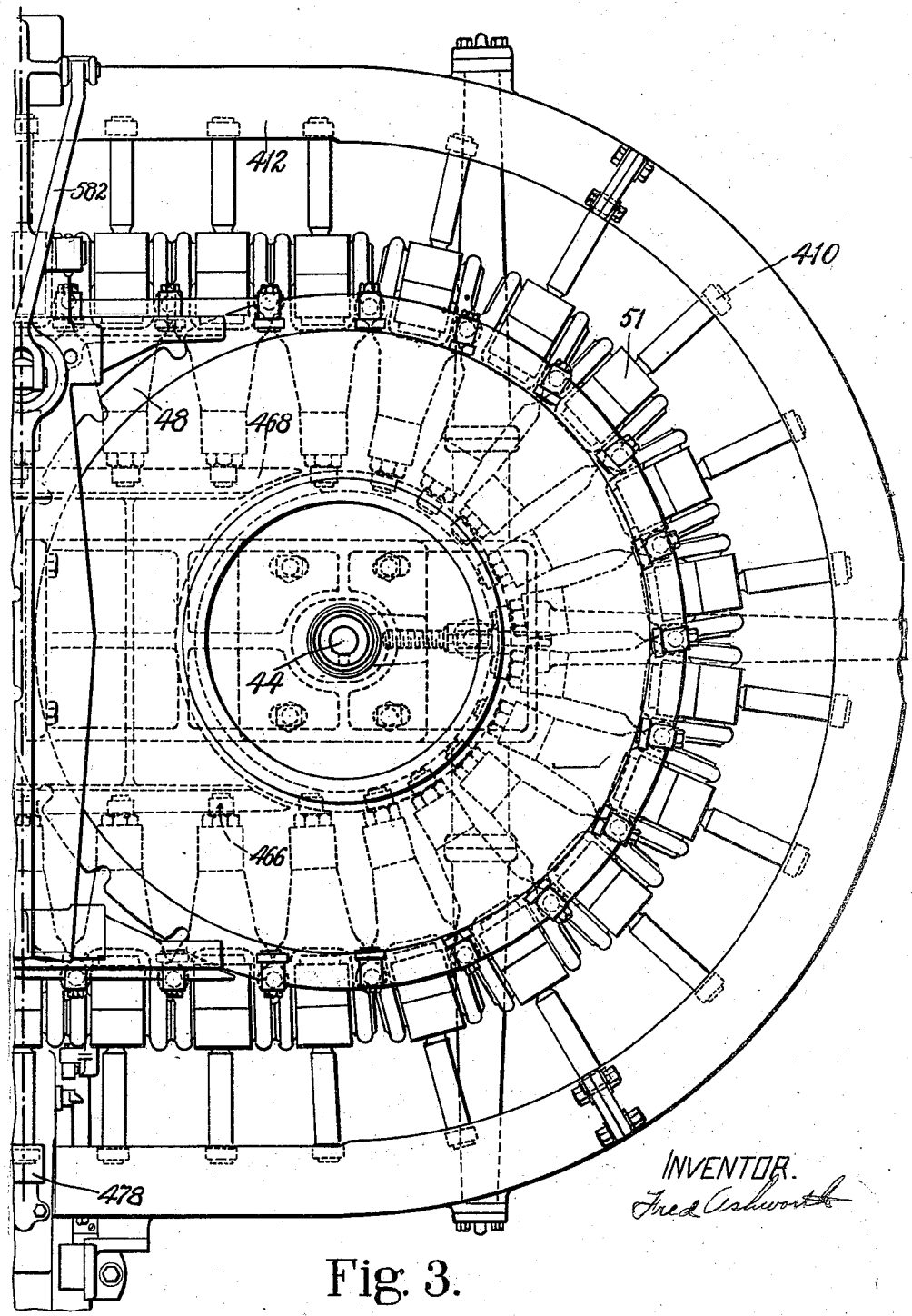
Fig. 3 is a plan view of the rear portion of the machine.

Figs. 1, 2 and 3, taken together, afford a plan of the entire machine.

Figure 5:
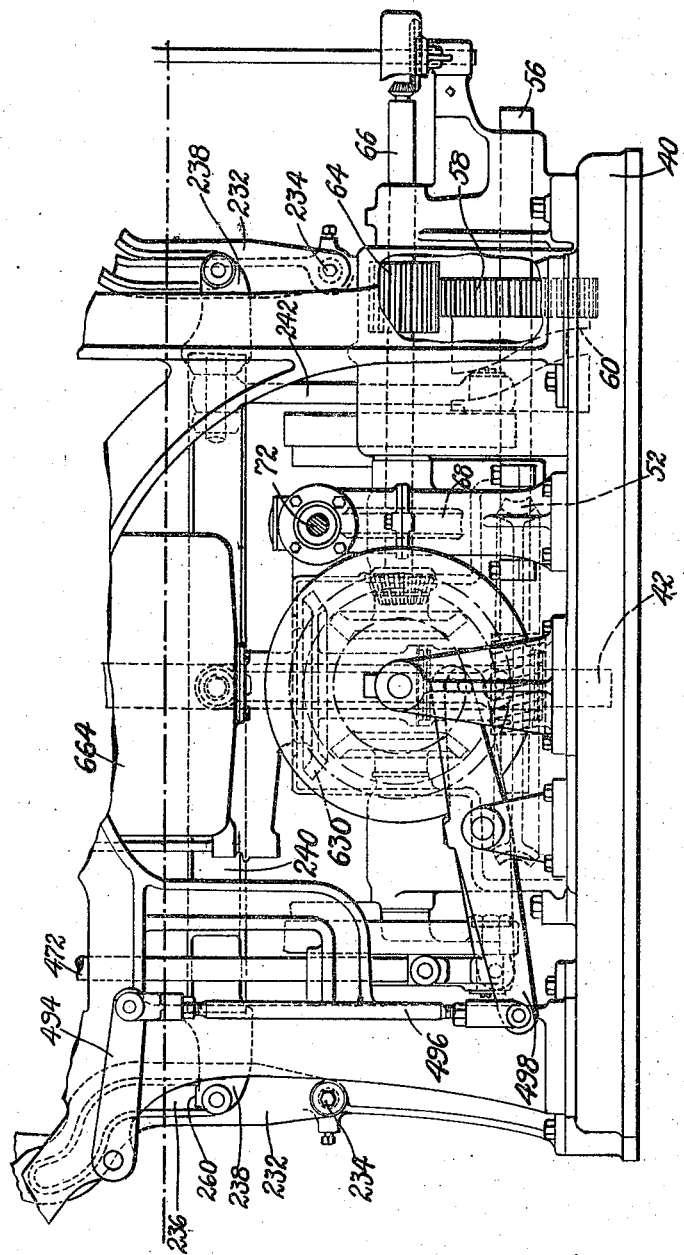
Figure 6:
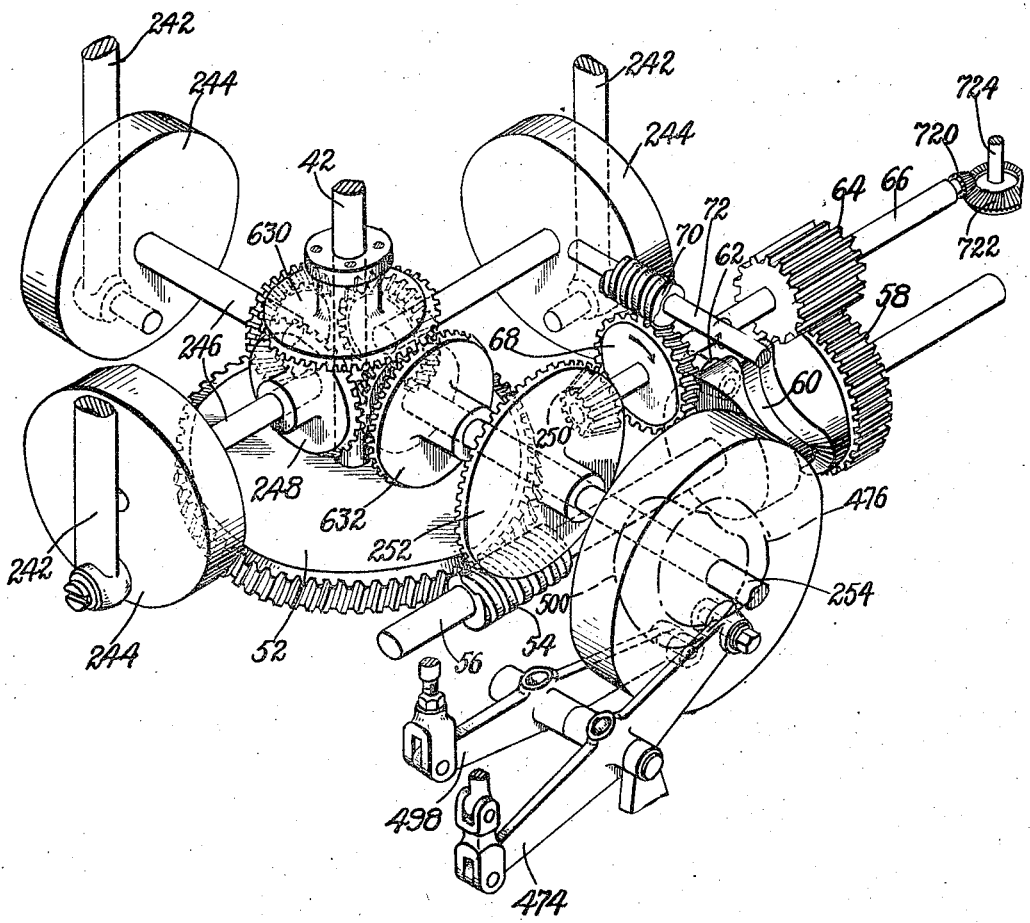
Figure 7:
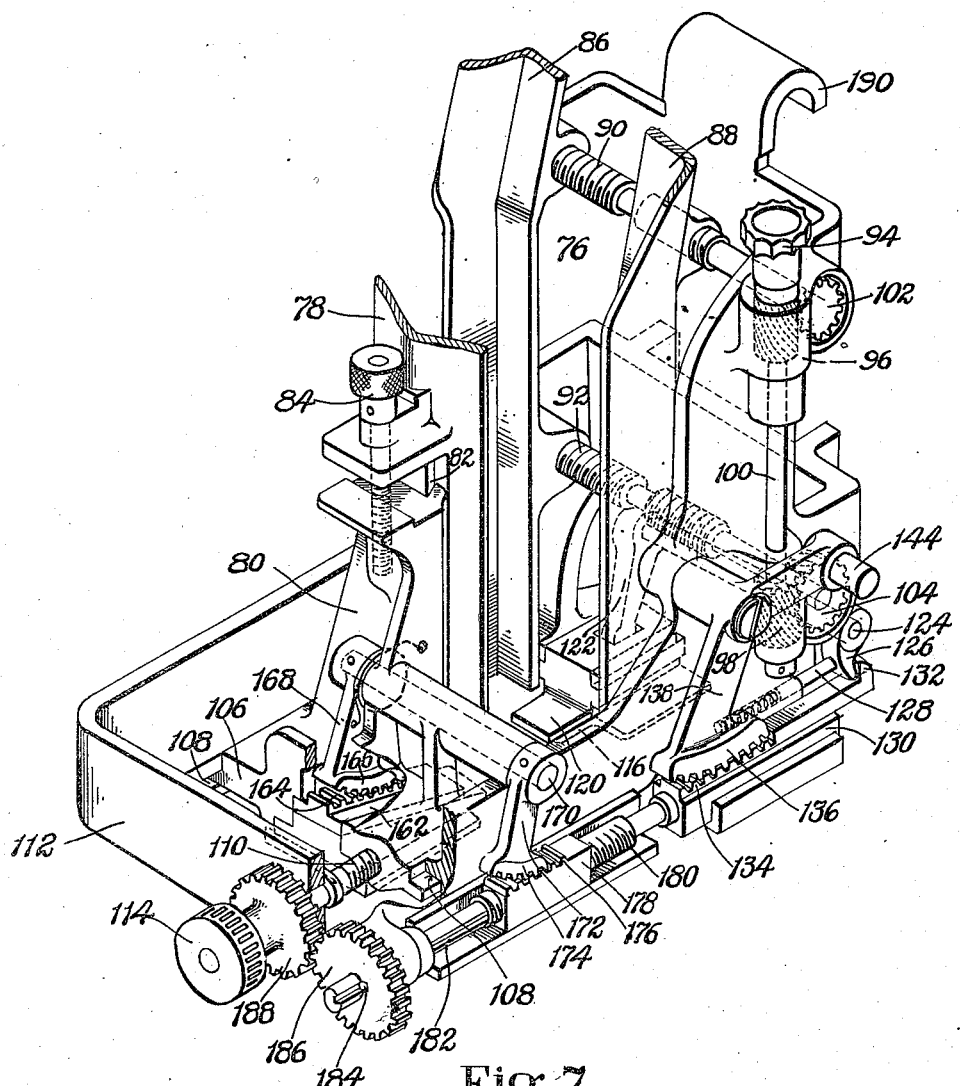
Figure 8:
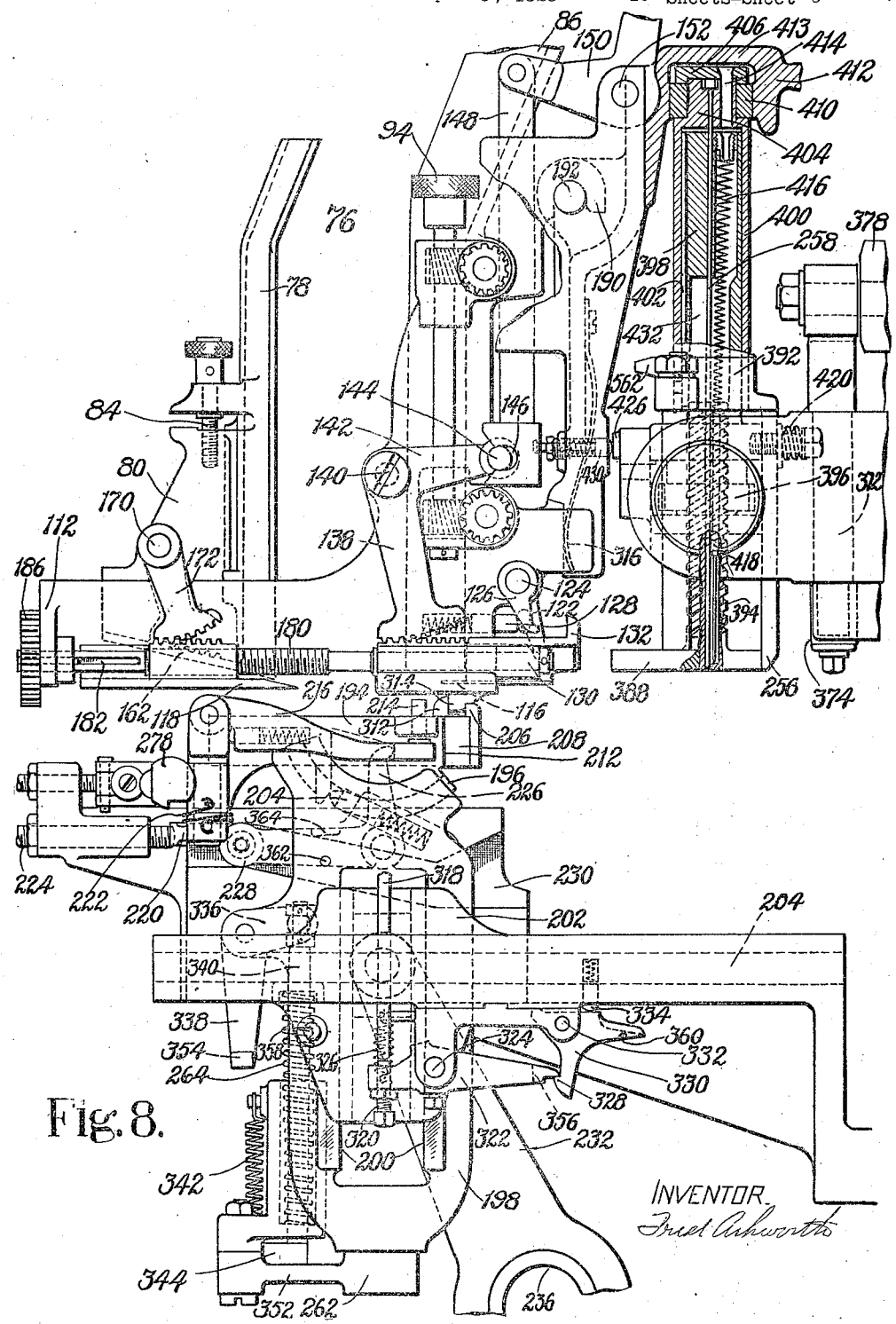
Figure 9:
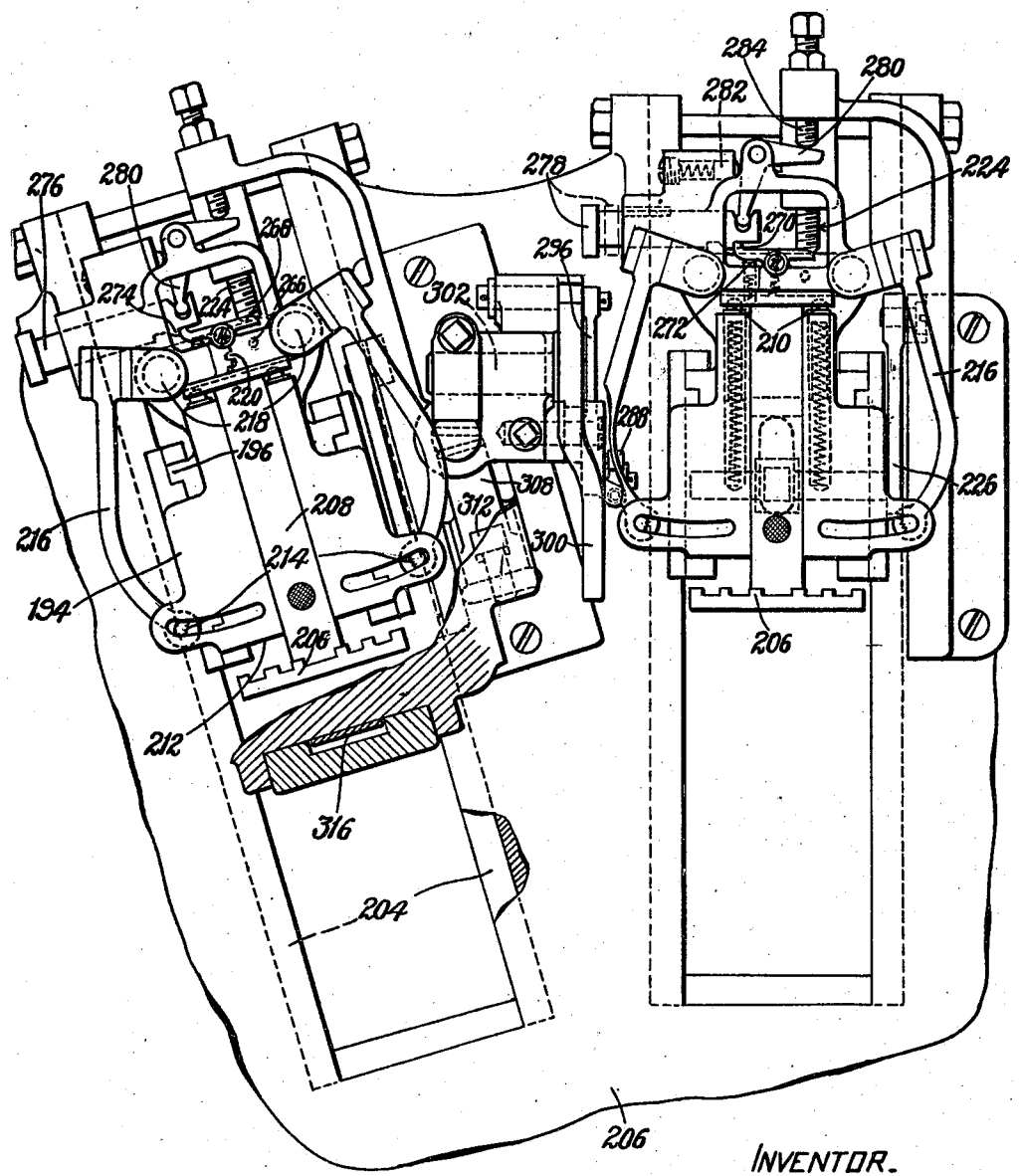
Figure 10:
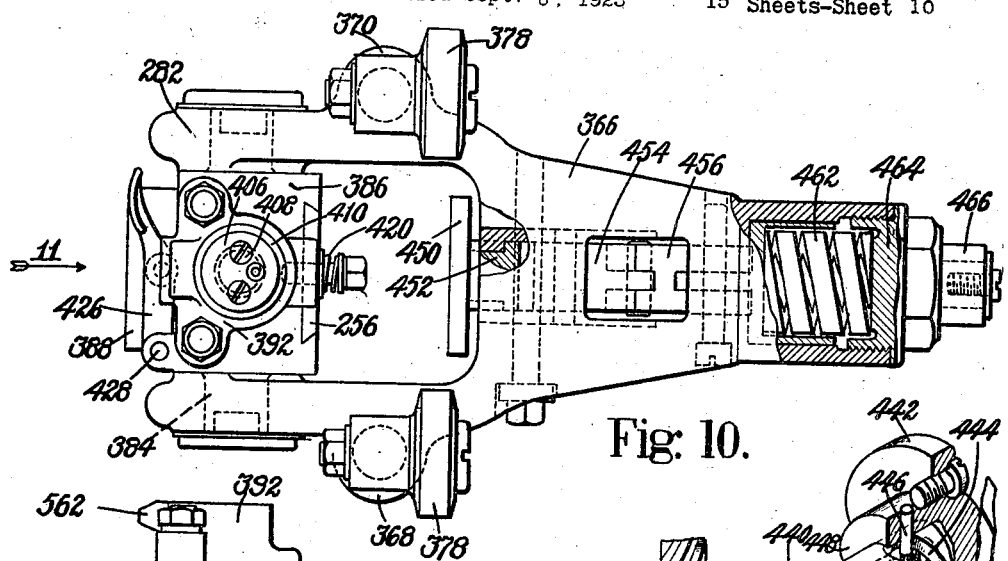
Figures 11, 12, 13:
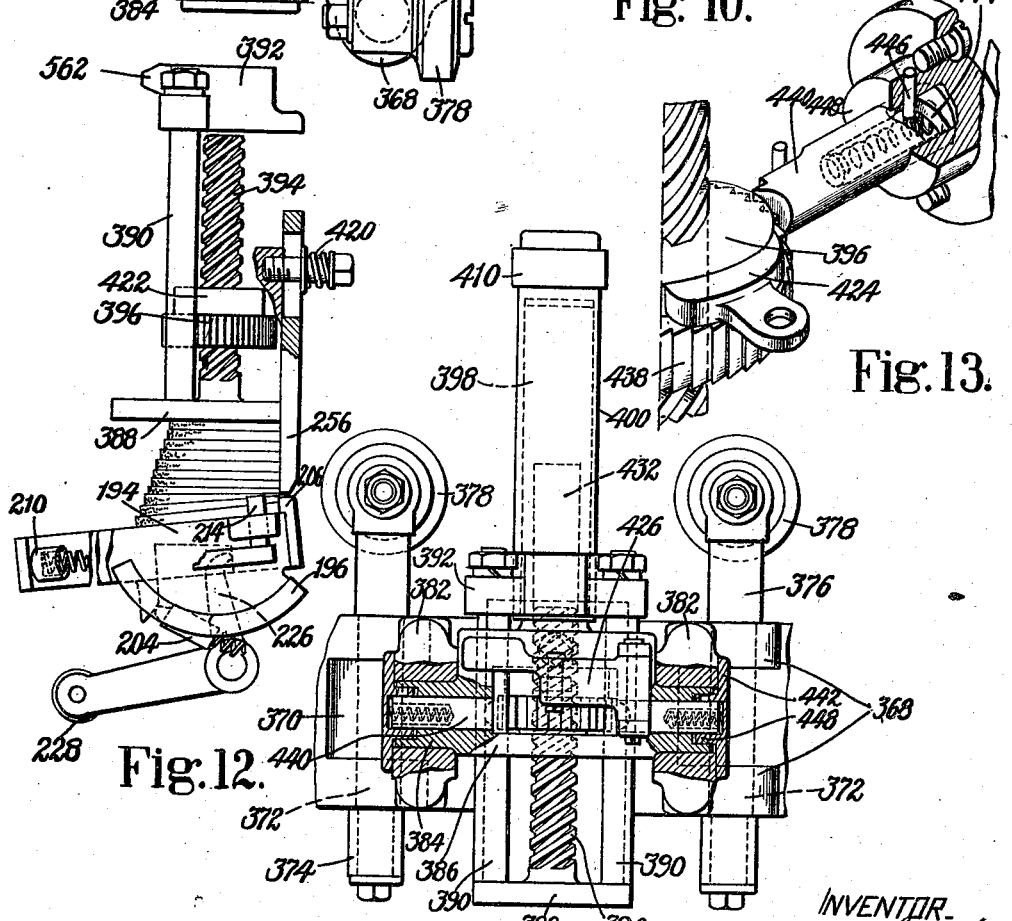
Figure 14:
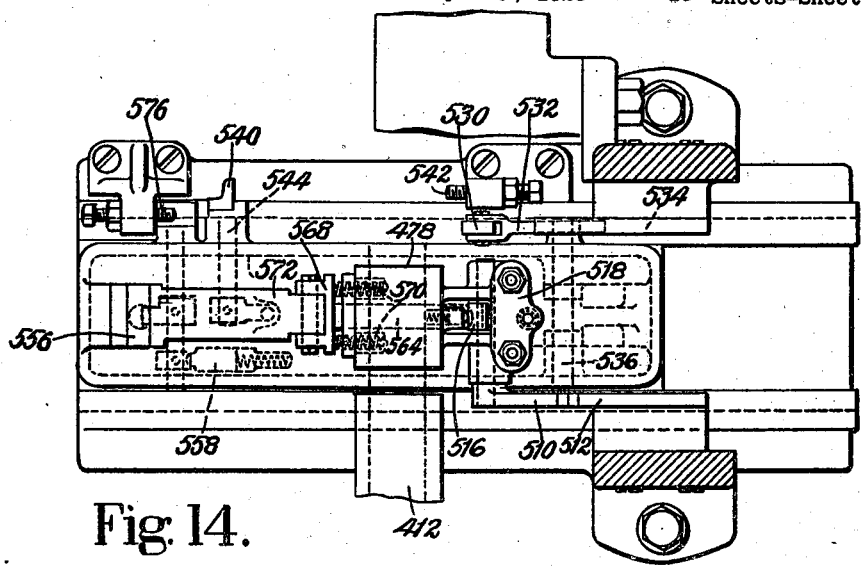
Figure 15:
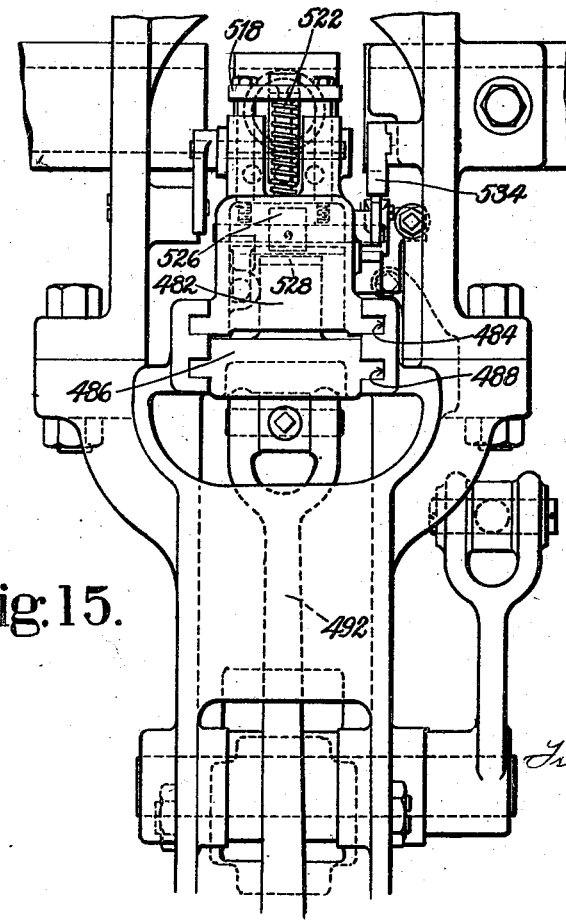
Figure 16:
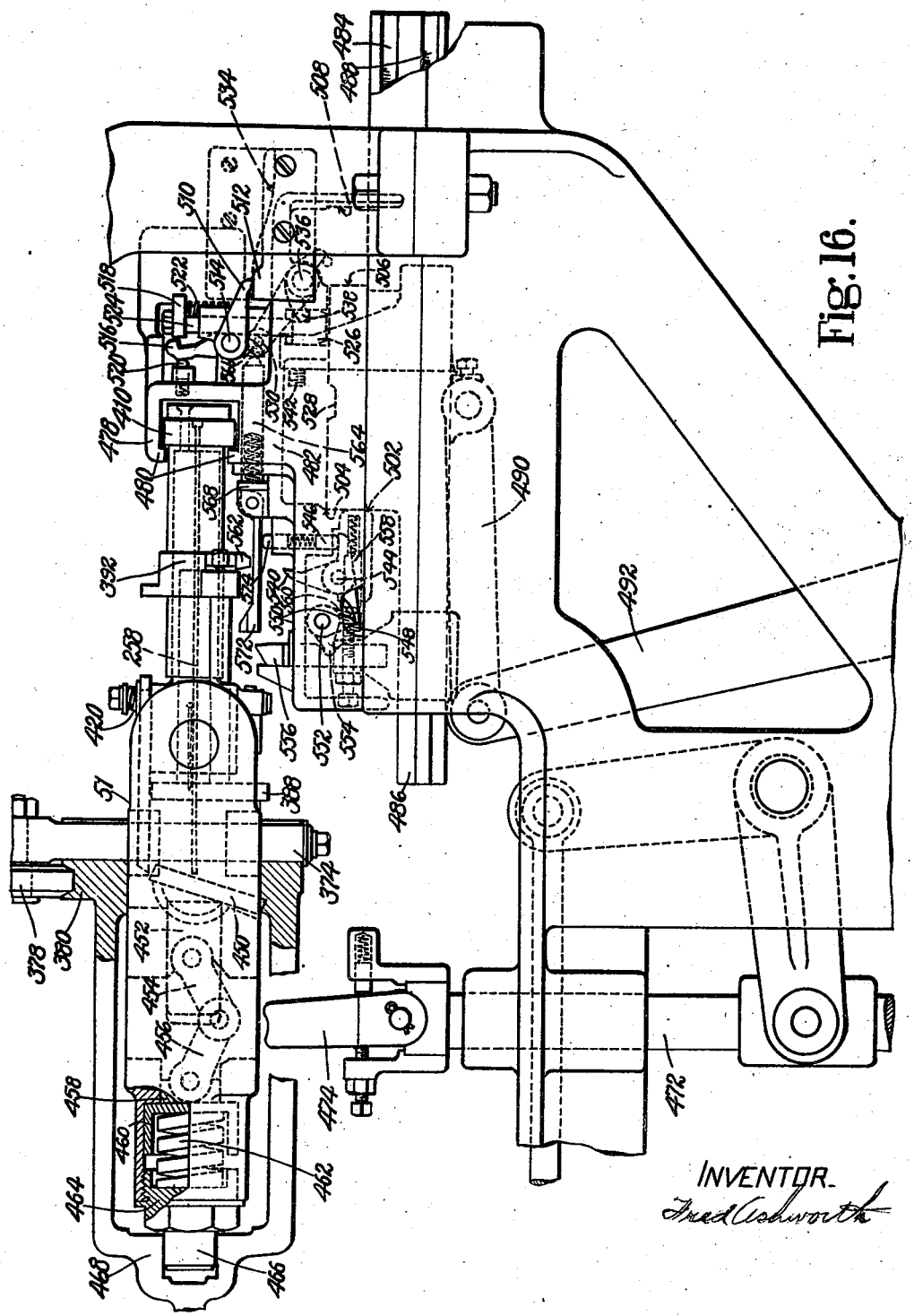
Figure 17:
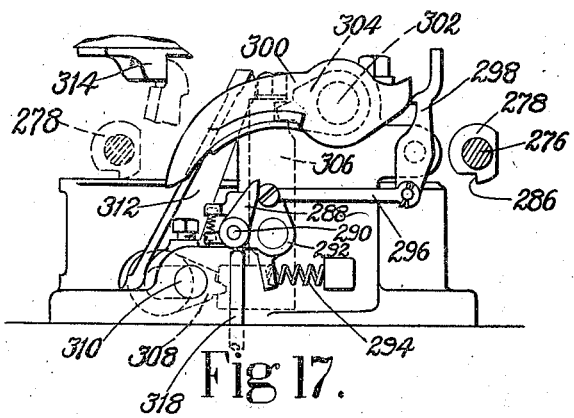
Figure 18:
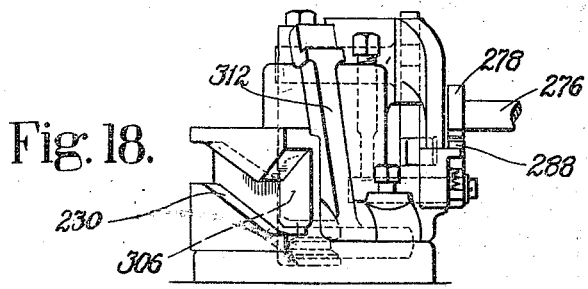
Figure 19:
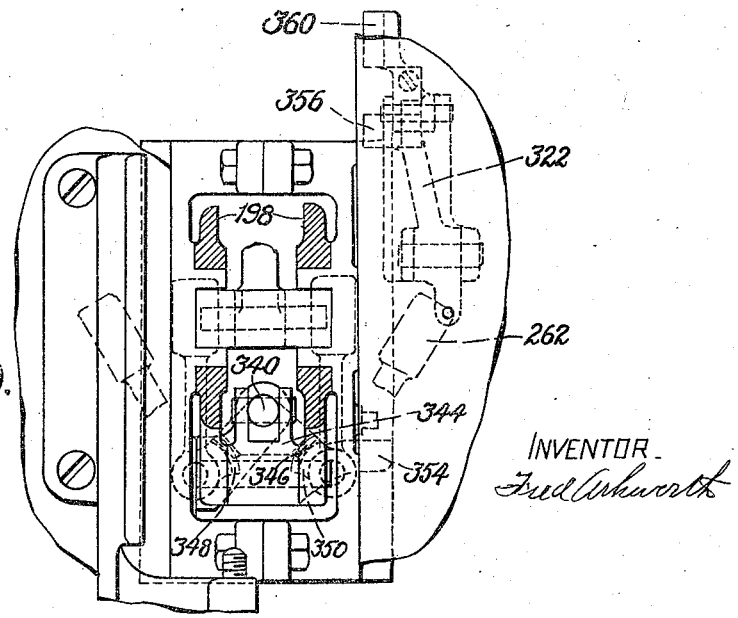
Figure 20:
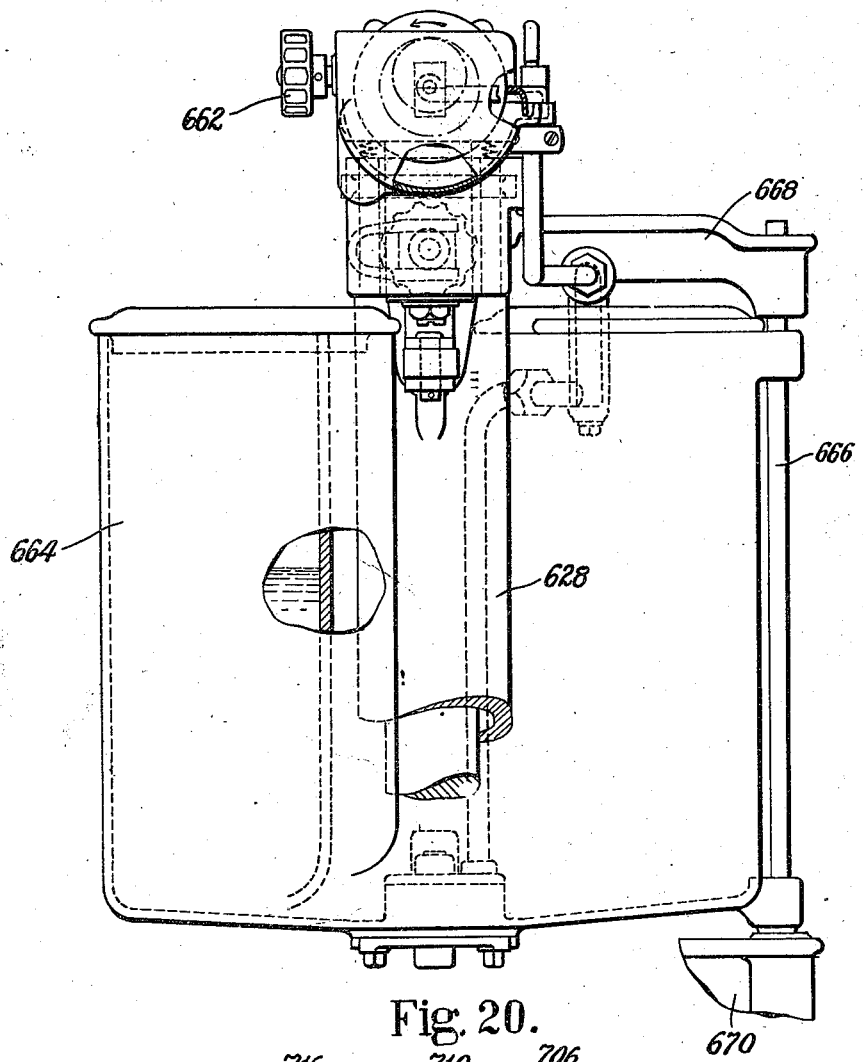
Figure 23:
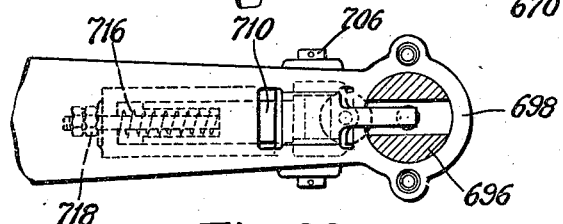

Fig. 4 is an elevation, partly in section, of the upper portion of the machine, looking toward the front from a point at the center of the longitudinal axis of the machine;

Fig. 5 is a view, from the same viewpoint as Fig. 4, of the lower, or base, portion of the machine;

Fig. 6 is a perspective showing the driving gearing, looking in the direction of the arrow 6 on Fig. 2;

Fig. 7 is a perspective of the major portion of one of the lift magazines, looking inwardly from the outside of the machine;

Fig. 8 is a side elevation of one of the lift magazines and mechanism which cooperates therewith;

Fig. 9 is a plan view of mechanism which receives lifts from the magazines and transfers them to assembling position;

Fig. 10 is a plan view of a portion of one of the press units;

Fig. 11 is an elevation looking in the direction of the arrow 11 on Fig. 10;

Fig. 12 is a side elevation of a portion of one of the press units with a heel therein;

Fig. 13 is a perspective view of a detail of the press unit;

Fig. 14 is a plan view of the assembling needle withdrawing and nail driving mechanism;

Fig. 15 is an elevation of the same looking at the right-hand end of Fig. 14;

Fig. 16 is a side elevation of the same with one of the press units;

Fig. 17 is a side elevation of a portion of the magazine throwout mechanism;

Fig. 18 is an end elevation of the same;

Fig. 19 is a plan of the same;

Fig. 20 is an elevation of the paste reservoir looking from the right of Fig. 21;

Fig. 21 is a plan view of the paste reservoir and paste pot;

Fig. 22 is an elevation of the mechanism shown in the right-hand portion of Fig. 21, on a larger scale;

Fig. 23 is a section on the line 23—23 of Fig. 22; and

Fig. 24 is a section on the line 24—24 of Fig. 22.

The machine illustrated in the drawings is a power driven machine which performs all the heel building and pressing operations completely automatically, the only service required of the attendant being to keep the magazines supplied with lifts and the nail and paste reservoirs supplied with nails and paste respectively. In plan, the machine is in the general form of an ellipse with its sides flattened.

A base member 40, Fig. 5, which rests upon the floor, supports a frame work which in turn carries the operating mechanisms of the machine. Two upright shafts 42 and 44, Figs. 1, 3 and 5, carry, respectively, sprocket wheels 46 and 48 which rotate in the same horizontal plane and have evenly spaced notches 50 in their peripheries. An endless carrier consisting of thirty-six heel building and pressing devices pivotally connected together in the manner of the links of a chain is arranged to engage the sprockets 46, 48 and to be supported and moved thereby. Each of the said building and pressing devices consists of a receiver unit, designated generally by the reference numeral 51, which will be described in detail hereinafter.

Referring particularly to Figs. 5 and 6, the lower end of the shaft 42 has secured to it a worm wheel 52 which meshes with a worm 54 upon a horizontal shaft 56 disposed transversely of the machine. The shaft 56 has secured to it a gear 58 and a cam 60. The cam engages a stationary cam roll 62, and the gear 58 is driven by a pinion 64 secured to a shaft 66, to which is also secured a worm wheel 68 driven by a worm 70 mounted upon the armature shaft 72 of an electric motor 74, which supplies the power for driving the entire machine.

The cam 60, cooperating with the stationary roll 62, causes the shaft 56, when it rotates, to reciprocate in the direction of its axis. This reciprocating motion, combined with the rotation of the shaft, causes the worm wheel 52 to rotate step by step, each step covering one twenty-second of a complete revolution. This form of mechanism for securing intermittent rotary motion is well known and need not be described in further detail. It will be understood that this step by step motion is imparted to the sprocket 46 and the endless carrier consisting of the units 51. The sprocket 48 rotates idly and serves merely as a support and guide for the extended part of the endless carrier.

The front portion of the machine is surrounded by a semi-circular series of substantially identical lift magazines 76, Fig. 1, one of which will be described in detail hereinafter. Twelve such magazines are provided in the illustrated machine, and they are arranged parallel to, and outside the path of, the endless carrier. Each magazine 76 is provided with a cooperating mechanism for removing lifts one at a time from the bottom of the magazine, transferring the lifts to, and assembling them in, the units 51 of the endless carrier. This mechanism will also be described in full detail hereinafter.

Referring now particularly to Figs. 7 and 8, wherein the details of one of the lift magazines are shown upon an enlarged scale, a V-shaped member 78 is supported in an upright position upon an adjustable bracket 80 with which it has a dovetailed connection 82, vertical adjustment of the member 78 upon the bracket 80 being effected by a convenient thumb screw 84. The member 78 constitutes the rear portion of the magazine and is adapted to engage the rounded, rear edges of the heel lifts stacked therein.

The breast corners of the lifts are engaged and guided by two angular magazine members 86 and 88 which are adjustable toward and from each other, transversely of the lifts, by means of right and left screws 90 and 92. A knob 94 is provided for effecting this adjustment and operates the screws 90, 92 simultaneously and equally through gears 96, 98 secured to the knob shaft 100 and meshing respectively with gears 102 and 104 which are secured to the respective right and left screws.

The base 106 of the bracket 80 is slidably mounted in stationary guides 108 and provision is made for adjustment of the rear magazine section 78 toward and from the breast guides 86, 88, to accommodate the magazine to lifts of different lengths, by a screw 110 threaded into the base 106 and held against longitudinal movement in the front portion 112 of the magazine mounting. A knob 114 secured to the shaft of the screw 110 facilitates manual operation of the screw in making the described adjustment.

Normally stationary plates 116, 118, extending respectively beneath the front and rear portions of the magazine space support the stack of lifts contained in the magazine when the lift delivering elements are retracted. A horizontally movable pusher 120, which engages the breast edge of the bottom lift in the magazine, is arranged to be reciprocated by a rocker arm 122 secured to a rock shaft 124 having at its outer end a dog 126 against which bears a spring pressed plunger 128, the tendency of which is to rock the lower end of the arm 122 in in a right hand direction, as viewed in Figs. 7 and 8, and retract the pusher 120. The rock shaft 124 is actuated in the reverse direction by a slide 130 having an upturned end 132 which engages the dog 126. Cut in the upper face of the slide 130 is a rack 134 which meshes with a gear segment 136 upon the lower end of one arm 138 of a bell crank lever which is pivoted at 140 to the magazine mounting and has another arm 142 in the end of which is a pin 144. The pin 144 is arranged to enter freely a horizontal slot 146 in a vertically reciprocable plunger 148 which is actuated at proper times by a bell crank lever 150 operating about a stationary pivot 152.

The lever 150 is connected by an adjustable rod 154 (see Figs. 1 and 4) to a slide 156 carrying a cam roll 158 which engages a cam 160 keyed to the upper end of the shaft 42. It will readily be understood that, when the shaft 42 is rotated the plunger 148 will be actuated and the slide 130 reciprocated.

Referring again to Figs. 7 and 8, a pusher 162 for engaging the rear end of the lift has a rack 164 cut in its upper face and is operated by a gear segment 166 on a rocker arm 168 which is secured to a shaft 170 journaled in the bracket 80. The shaft 170 has secured to its outer end a rocker arm 172 having a gear segment 174 which meshes with a rack 176 formed in a slidable block 178 which normally moves with the slide 130. For the purpose of maintaining the pusher 162 in proper relation to the rear magazine section 78 when the position of said magazine section is adjusted, and at the same time, maintaining the gear 174 in proper mesh with the rack 176, the block 178 has threaded through it a screw 180 which is constrained to move longitudinally with the slide 130 but can rotate freely therein. A spline 182, formed in the shaft of the screw 180, is engaged by a key 184 in a gear 186 journaled in a bearing in the magazine mounting. The gear 186 meshes with a similar gear 188 secured to the adjusting screw 110. Thus, when the screw 110 is turned to adjust the rear magazine section the screw 180 is simultaneously turned to effect a corresponding adjustment of the sliding block 178. The splined connection between the screw 180 and the gear 186 permits the slide 130 and the block 178 to operate without affecting the adjustment of the block. It will be understood from the preceding description that the pushers 116 and 162 move simultaneously in opposite directions, except that in the left hand movement of the slide 130 (Fig. 8) the retracting movement of the pusher 162 begins before the advancing movement of the pusher 120, due to a certain amount of lost motion between the element 132 and the dog 126.

The magazine, with most of its operating mechanism, is readily removable as a unit from the machine. To this end the magazine mounting is provided with a hook 190 arranged to engage a stationary, horizontal pin 192 mounted in the frame of the machine. This pin also serves as a pivot about which the magazine unit may be swung, under certain circumstances, to throw the magazine out of operation without removing it, as will be subsequently described in detail. In its normal operation lifts are delivered one at a time from the bottom of the magazine to a lift transferring mechanism which will now be described.

Referring particularly to Figs. 8 and 9, 194 indicates a lift receiving table having segmental flanges 196 guided in corresponding slots formed in the upper end of a support 198 having surfaces 200 cooperating with vertical guides in a horizontal slide 202. A spring pressed plunger 204 bearing against a downwardly projecting portion of the table 194 tends to maintain the table horizontal but, by yielding, permits the table to rock to accommodate itself to a wedge lift. A breast gage 206 is mounted upon the end of a slide 208, the upper face of which is flush with the surface of the table 194 and spring pressed plungers 210 tend to move the breast gage toward the table until the lift engaging surfaces of the breast gage meet the edge 212 of the table. A pair of side jaws 214 are arranged to engage the edges of the lift and are carried by arms 216 pivoted at 218 and geared together for equal and opposite movement as shown at 220. Torsion springs 222, surrounding the pivots 218 tend continually to move the jaws 214 toward each other. The slide 202 is movable horizontally in radial guides 204 formed in a stationary table 206 bolted to the frame of the machine, and when the slide 202 is in lift receiving position, beneath the magazine 76, one of the gear members 220 engages an adjustable stop screw 224, causing the jaws 214 to be held open. The position of the breast gage 206 is controlled by a bell crank lever 226, one end of which engages in a recess in the lower face of the slide 208 and the other end of which carries a cam roll 228, engaging in a stationary cam 230 mounted upon the table 206. As will be apparent from Fig. 8 the breast gage 206 is spaced from the edge 212 of the table 194 when the table is in lift receiving position.

The mechanism is so timed that the table 194 remains stationary beneath the magazine 76 while the slide 130 moves first toward the left and then toward the right. As the said slide starts to move toward the left the pusher 162 also moves in the same direction. As soon as the space between the element 132 and the dog 126 is taken up the pusher 120 begins to move toward the left, pushing the lowermost lift in the magazine ahead of it up the inclined, upper face of the supporting plate 118. This movement of the lift continues until the breast edge of the lift drops off the supporting plate 116 and falls upon the table 194. The pushers then move in the opposite direction, the pusher 162 engaging the rear end of the lift and sliding its breast edge along the table 194 until it substantially reaches the breast gage 206. By this time the rear end of the lift is pushed off the supporting plate 118 and drops upon the table 194, where the lift rests with its breast edge approximately located by the gage 206 and its side edges between the jaws 214 which, however, are separated by a distance greater than the width of the lift. The pushers 120 and 162 now come to rest and the slide 202 starts to move toward the right, as seen in Fig. 8, to a delivering position beneath the heel building device or unit.

The movement of the slide 202 is produced by a lever 232 pivoted at 234 to a stationary part of the machine and having a cam slot 236 in which engages a cam roll carried by a bracket 238 projecting from a movable beam 240 which is reciprocated vertically by connecting rods 242, of which there are three (see Figs. 5 and 6). The connecting rods 242 are operated by crank disks 244 upon shafts 246 which are geared together by bevel gears 248 driven from the shaft 66 through a pinion 250, a gear 252 and a shaft 254 to which one of the gears 248 is affixed.

As the beam 240 rises, the lever 232 is swung inwardly and the lift transferring carriage supported by the slide 202 is moved toward the right in Fig. 8. As the slide starts to move, the arms 220 leave the stop screw 224 and the torsion springs 222 operate immediately to close the side jaws 214 upon the side edges of the lift. As the motion of the carrier continues, the roll 228 descends along the path of the cam 230, moving the arm 226 toward the left and permitting the spring pressed plungers 210 to move the breast gage 206 rearwardly of the lift until the breast gage is stopped by engaging the edge 212 of the lift supporting table 194. During this action the lift is moved rearwardly of itself between the side jaws 214, the sides of which are corrugated, as shown, and which offer sufficient resistance to the rearward movement of the lift to insure that the breast edge of the lift shall be seated squarely and accurately against the breast gage 206 by the time the latter has reached its final position. The inward movement of the slide 202 continues until the breast edge 212 of the table 194 reaches a position in vertical alinement with the breast gage 256 of the heel building unit.

It may be convenient at this point to indicate briefly that the heel building unit is provided with a lift impaling pin 258, upon which the lifts are forced one by one as they are being assembled with their breast edges against the breast gage 256.

When the table 194, with the lift upon it, has reached a position in which its breast edge 212 is in alinement with the breast gage 256, the slide 202 stops, and the support 198, with the table 194, is elevated to force the lift upwardly until it is impaled upon the pin 258, whereupon the support 198 is caused to descend to its former level and is ready to return to lift receiving position.

For the purpose of elevating the support 198, each of the brackets 238 is provided with abutments 260 (see Fig. 5) adapted to engage the lower faces of blocks 262 (see Fig. 8) which normally occupy positions beneath the lower end of the support 198 and transmit motion from the bracket 238 to the said support. The downward movement of the support 198 is effected by a compression spring 264.

The description of the operation of the lift transferring mechanism has, so far, been based upon the assumption that the machine was operating normally and that a lift had been delivered from the magazine at the proper time. It may happen, however, that one or more magazines will fail to deliver a lift when it is required. Under such circumstances, it is desirable that no further lifts be supplied to the heel which was intended to contain the missing lift. To meet this contingency automatic mechanism is provided for throwing out the succeeding magazines of the series.

One of the magazines 76 may fail to deliver a lift, in which event the lift transferring carrier will start to move inwardly with no lift upon the table 194. As previously described, the arms 216 move toward each other as soon as the carriage starts. One of the gear arms 220 has on its under side a pin 266, see Fig. 9, which is inoperative to produce any result unless the said gear arm moves further than it is normally intended that it shall. If there is no lift upon the table 194 the jaws 214 move together further than they otherwise would and the pin 266 engages the tail end 268 of a latch, the nose 270 of which is engaged by a spring pressed plunger 272 tending to hold the latch in engagement with a shoulder 274 upon a horizontal slide 276. The slide 276 carries at its outer end a cam 278 and the latch normally locks the slide in the position shown in full lines in Fig. 9. One arm of a bell crank lever 280 engages in a notch in the slide 276 and a spring pressed plunger 282, bearing upon the said arm, tends to move the slide 276 into the dotted line position, Fig. 9, when the latch 270 is released. The other arm of the lever 280 is arranged to engage an adjustable stop screw 284 when the lift transferring carriage is in its outer position.

When, by reason of the absence of a lift upon the table 194, the jaws 214 close too far and the latch 270 is released, the slide 276 immediately moves inwardly to the dotted line position above referred to. Now, as the inward movement of the lift transferring carriage continues, the cam member 278, which has at its lower side a hook 286, Fig. 17, engages a pawl 288 pivoted at 290 upon a rocker member 292 and rocks the said member in a counterclockwise direction, as viewed in Fig. 17, against a spring 294. The pivotal mounting of the pawl 288 is merely for the purpose of permitting the cam member 278 to pass over it idly upon its return stroke. The rocker member 292 is connected by a link 296 to a latch 298 which is normally hooked over the end of a rocker member 300 mounted upon a shaft 302, to which is also secured a rocker arm 304. A tooth on the end of the arm 304 engages in a notch in a plunger 306 which is also geared to a rocker arm 308 upon a shaft 310 carrying a lever 312. The upper end of the lever 312, when it is rocked to the dotted line position, Fig. 17, engages a lug 314 upon the magazine mounting, holding the magazine in operative position against the tension of a spring 316 (see Figs. 8 and 9).

When the rocker member 292 is operated, by engagement of the hook 286 with the pawl 288, and the latch 298 is released, the plunger 306 descends and the lever 312 is thrown away from the lug 314, permitting the spring 316 to swing the magazine outwardly, about the pin 192 as a pivot, out of operative position. From Fig. 9 it will be clear that the magazine thus thrown out of operation is the one next succeeding the one above the lift transferring carrier which failed to receive a lift and which initiates the magazine throwing-out operation. This magazine controlling mechanism is repeated for each magazine and, inasmuch as the magazine which was thrown out does not deliver a lift to its lift transferring carrier, the throw-out operation proceeds through the remainder of the magazines in the series and no further lifts are delivered to the heel which was intended to contain the lift first missing. This continues as long the the lift supply fails. When, however, the lift supply is restored and a lift is fed to a table 194, the cam member 278, which is restored to its full line position, Fig. 9, by the stop screw 284 at each outward movement of the lift transferring carrier, remains in that position because the latch 270 is not released, and the said cam member, as the carriage moves inwardly, engages the under side of the rocker 300, restoring it to its former position where it is locked by the latch 298. Through the connections previously described, the restoration of the member 300 causes the lever 312 to engage the lug 314 and restore the magazine to operative position ready to deliver the next lift. The rocker 300 normally remains locked in this position, the reciprocation of the cam member 278 beneath it having no effect.

After each lift, except the last one in the heel, is impaled upon the pin 258 its lower face is pasted, by mechanism which will be described presently, and it is desirable that when a transferring table 194 has no lift upon it it shall not be elevated into contact with the previously impaled and pasted lift. Provision is, therefore, made for swinging the blocks 262 out from under the lower end of the support 198 when the lift transferring carrier is moved inwardly of the machine without a lift upon the table. When the rocker member 292 is operated by engagement of the hook 286 with the pawl 288 it strikes the upper end of a rod 318, the lower end of which rests upon the point of an adjustable screw 320 threaded through one end of a trip member 322 movable about a stationary pivot 324, as shown in Fig. 8. A spring 326 tends to elevate the end of the trip member upon which the rod 318 is supported. When the rod 318 is depressed the opposite end of the member 322 is elevated until it is caught and held by a hook 328 formed upon a latch 330 movable about a stationary pivot 332 and actuated toward the trip member 322 by a spring pressed plunger 334. Mounted upon the slide 202 is a bell crank lever having a substantially horizontal arm 336 and a depending arm 338, The arm 336 is connected to a vertically reciprocable plunger 340 which is normally elevated by a pull spring 342, connected to a block 344 upon the lower end of the plunger 340. The block 344 has inclined tongues 346, see Fig. 19, which engage in inclined cam grooves 348 formed in the ends of arms 350 which are integral with the arms 352 carrying the blocks 262. Thus when the plunger 340 is depressed the blocks 262 are swung out from under the support 198, and vice versa.

The arm 338 has, at its lower end, a lateral projection 354 which, upon the inward movement of the slide 202, engages a lug 356 projecting from the inner face of the trip member 322 when the said member is held up by the pawl 330, as shown in Fig. 8. When the projection 354 strikes the lug 356 the bell crank lever is rocked, the plunger 340 is depressed and the blocks 262 are swung out from under the support 198. The thickness of the blocks 262 is approximately equal to the normal vertical movement of the support 198, with the result that when the blocks are removed from between the lower end of the support and the abutments 260 no upward movement is imparted to the table 194 when the beam 240 rises.

When the slide 202 reaches the limit of its inward movement a pin 358 carried by it engages a cam surface 360 on the pawl 330, rocking the pawl and releasing the trip member 322 so that, as the slide 202 is retracted the blocks 262 are again swung under the support 198.

A pin 362 is mounted in the support in a position to be engaged by a lug 364 projecting from the side of the arm carrying the cam roll 228 when the said roll leaves the cam 230 during the inward movement of the slide 202, the roll being supported in a position to enter the mouth of the cam readily upon the return stroke.

The construction and operation of one of the heel building and pressing units 51 will now be described. The details of this part of the mechanism are best shown in Figs. 8, 10, 11, 12, 13 and 16. A body member 366 is provided at one side with a pair of spaced ears 368 and at the other side with a lug 370 the width of which is the same as the space between the ears 368. The ears and the lug are the equivalent of the two parts of a hinge, the lug on one unit 51 being located between the ears on the next adjacent unit and so on around the machine, the complete string of units 51, hinged together, constituting an endless carrier which is virtually a chain. The hinge pins connecting adjacent units consist of short shafts 372 each of which passes through a lug 370 and a pair of ears 368. The lower end of each shaft 372 is provided with a roll 374. The upper end of the shaft is cylindrical at 376 for a distance approximately equal to the length of the roll 374, and above this smooth portion is mounted a trolley wheel 378.

The endless carrier is supported and guided in an approximately elliptical path in the machine by a stationary track 380 in which the trolley wheels 378 run, the carrier being advanced in its path of movement by the rolls 374 and the shaft extensions 376 engaging in the notches 50 of the sprockets.

The unit body 366 is provided with bearings 382 for journals 384 projecting from the sides of a box 386 which is thus pivotally mounted in the unit body in such a way that it can be turned from an upright to a horizontal position therein.

A stripper plate 388 is carried by two side rods 390 which are slidable through the box 386 and are connected at their upper ends by a cross head 392. The stripper plate also has mounted rigidly upon it an upright screw 394, of rather steep pitch, passing through a nut 396 which is, at times, free to rotate but is held against axial movement in the box 386. It will be apparent that when the stripper plate 388 moves up or down with respect to the box the nut will be rotated.

Rigid with, and extending upwardly from, the box 386 is a guide member 398 which is surrounded by a sleeve 400 splined at 402 to the guide member to permit longitudinal movement of the sleeve upon the guide member while preventing the sleeve from rotating. The outer end of the sleeve is closed by a head 404 in which is mounted the impaling pin 258, the latter being retained in position by a cap 406 secured to the head 404 by screws 408. An anti-friction roll 410 is journaled upon the upper end of the sleeve member 400 and travels in a stationary guiding track 412. The impaling pin 258 passes through a hole in the upright guide member 398 and an axial hole in the screw 394.

A suitable nail hole 414 is drilled through the cap 406 and the head 404, leading into the nail guiding tube 416 arranged to conduct a nail into a recess 418 formed within the screw 394 beside the path of the impaling pin 258.

The breast plate 256 is mounted to slide vertically through a limited distance on the box 386 and is held in position by a friction device 420. When the parts are in the position illustrated in Fig. 8 and the table 194 is elevated to force a lift upon the impaling pin 258, the pin is prevented from retreating by engagement of the cap 406 with the roof portion 413 of the track 412. As the lift is forced upon the impaling pin the stripper plate 388 is forced upwardly through a distance equal to the thickness of the lift, against the resistance due to the friction of the nut 396 upon the screw 394 and the friction between the nut and the box 386. In order to produce the desired amount of friction and to be able to regulate the same, the nut is provided with a brake drum 422 against which bears a brake shoe 424, Fig. 13, to which is connected a lever 426, Fig. 10, pivoted to the box 386 at 428 and a plunger 430, Fig. 8, backed up by an adjustable spring, bears against the free end of the lever 426 to produce the desired braking effect. The member 398 is chambered at 432 to receive the end of the screw 394 as the stripper plate ascends.

After each lift is impaled on the pin 258 its outer face is coated with paste by a paste roll 434, Fig. 4, operated by mechanism which will be fully described hereinafter. As successive lifts are impaled, in the process of assembling a heel, the stripper plate 388 retreats until, at the completion of the lift assembling, it has assumed the position shown in Fig. 12. The purpose of mounting the breast plate 256 in a manner to permit it to yield upwardly is apparent also from this figure wherein the rocking of the table 194, incident to the forcing of lifts upon a heel pile containing one or more wedge lifts, is noticeable. As the table 194 rocks, the breast gage 206 is somewhat elevated, striking the plate 256 which would interfere with it if the said plate could not yield. After the heel is completely assembled upon the impaling pin it is to be subjected to pressure, and to this end the box 386, with the mechanism mounted upon it, is turned over into a horizontal position. To accomplish this the guide track 412 is so curved, as shown at 436 (Fig. 1) that, as the endless carrier advances, the impaling pin and associated mechanism are turned from a vertical to a horizontal position.

During the time when the heel is being turned over, the nut 396 is locked in order to prevent any further retreat of the stripper plate 388 when pressure is applied to the heel. For the purpose of locking the nut, ratchet teeth 438, see Figs. 11 and 13, are provided upon its periphery and radially moving, spring pressed pawls 440 are arranged to co-operate with the teeth at the proper time. The pawls are slidably mounted in holes drilled axially of the journals 384 and their springs are retained by caps 442 secured to the outer faces of the bearings 382. Each of the pawls is provided with a cam slot 444 engaging a pin 446 mounted in a stationary boss 448 projecting inwardly from the cap 442. When the parts are in the position shown in Figs. 11 and 12 the pawls are retracted, permitting the plate 388 to recede when pressure is applied to it. As the parts are turned over into the position shown in Fig. 16 the pawls are released and caused to engage in the teeth 438, locking the nut 396 against rotation and positively holding the plate 388 against further recession.

Co-operating with the plate 388 to apply pressure to the assembled heel pile is a presser plate 450, see Figs. 10 and 16, mounted upon a block 452 which is slidable in a suitably formed guiding opening in the body member 366. The presser plate 450 is mounted to rock upon the block 452 in order that it may accommodate itself to the wedge of the heel. The presser plate is actuated by a toggle comprising links 454, 456 seated respectively in the block 452 and a sliding block 458 bearing against a thimble 460 surrounding a heavy spring 462 which is retained in a state of compression by a plug 464 screwed into the outer end of the member 366. On the outer end of the plug 464 is a roll 466 which travels in a guiding track 468 extending from the sprocket 46 to the sprocket 48. The sprockets themselves are provided with guiding grooves 470 in alinement with the tracks 468, the grooves and tracks serving to maintain the body of the unit 51 permanently in horizontal position.

When the parts have reached the position shown in Fig. 16 the endless carrier stops with the center of the toggle 454, 456 immediately above a vertically reciprocable plunger 472 which has, at its upper end, a bunter 474 arranged to engage the center of the toggle and straighten the latter to apply pressure to the heel. The plunger 472 is actuated at the proper times by a cam lever 474 operated by a cam upon the shaft 254, the center line of the cam path being indicated at 476 in Fig. 6. The cam is so formed that the straightening of the toggle occurs in two steps, for a purpose which will appear later.

A nail loader 472 is arranged in proper relation to the track 412 to drop a nail into the hole 414 just before the lift impaling element begins to turn from a vertical position. Therefore, when the unit 51 reaches the position shown in Fig. 16 a nail is lying in the recess 418 on top of the impaling pin 258, as shown in dotted lines. The plunger 472 is first elevated sufficiently partially to straighten the toggle 454, 456, placing the impaled heel pile under an initial pressure. While the heel is thus held the impaling pin is withdrawn sufficiently to permit the nail to fall in front of it, whereupon the impaling pin, serving as a nail driver, is advanced just far enough to drive the nail, the pin stopping with its end flush with the surface of the plate 388. The upward movement of the plunger 472 is then completed, placing the heel pile under heavy pressure and clinching the point of the nail. The mechanism for accomplishing these functions is illustrated in Figs. 1, 14, 15, and 16.

A short section 478 of the track 412 is entirely independent of the stationary portion of the track and is movable transversely with respect thereto. The track section 478 is provided with inwardly turned flanges 480 and at each step in the movement of the endless carrier one of the units 51 stops with its roll 410 in the track section 478 and behind the flanges 480. The track section 478 is carried by a slide 482 movable in horizontal stationary guides 484 and actuated at the proper times by a section slide 486 movable in guides 488 immediately beneath and parallel to the guides 484. The slide 486 is connected by a link 490 to a lever 492 to which is rigidly connected a rocker arm 494 joined by a connecting rod 496 to a cam lever 498 operated by a cam upon the shaft 254, the center line of which cam is indicated at 500 (see Fig. 6).

Upon the slide 486 is an abutment having a face 502 arranged to engage a face 504 upon the upper slide 482, and a face 506 arranged to engage a co-operating face 508 upon the slide 482, the amount of lost motion between the two slides being equal to the difference between the highest heel and the lowest heel that are to be built in the machine. After the plunger 472 has partially straightened the toggle 454, 456, to apply a preliminary pressure to the heel, the slide 486 is moved toward the right, as viewed in Fig. 16. After the space between the faces 506 and 508 has been taken up the continued movement of the slide 486 carries the slide 482 with it. As the slide 482 moves toward the right a latch releasing lever 510 moves off a stationary cam 512. The lever 510 is secured to a rock shaft 514 upon which is mounted a latch 516 arranged to be hooked over a cross head 518 by a spring pressed plunger 520. The cross head 518 is supported by a compression spring 522 and is connected by vertical guide rods 524 to a locking dog 526 arranged to enter a notch 528 in the upper face of the slide 486.

As the slides move outwardly a cam roll 530 in the end of a lever 532 engages the under side of a stationary cam 534, rocking the cam lever and the shaft 536 to which it is secured. The shaft 536 carries a short arm 538 engaging a shoulder on the locking dog 526 and, when the shaft 536 is rocked by engagement of the roll 530 with the cam 534, the locking dog is depressed, against the tension of the spring 522 into the notch 528, locking the slides 482 and 486 positively together. When the locking dog 526 is thus depressed the cross head 518 descends with it and the latch 516, which has been released by the end of the lever 510 passing off the high part of the cam 512, hooks over it and holds it down. Inasmuch as the roll 410 is carried by the head 404, which also carries the impaling pin 258, the outward movement of the slide 482 causes the impaling pin to be withdrawn from the heel pile. This outward movement is sufficient in extent to withdraw the pin far enough to permit the nail to fall down in front of its point.

As the outward movement of the slides, after they are locked together, continues a tappet 540 engages a stop screw 542, rocking the shaft 544, upon which the tappet is mounted, against the tension of a spring pressed plunger 546 and disengaging a hook 548, also mounted upon the shaft 544, from a short rocker arm 550 which is secured to a rock shaft 552. A rocker arm 554 upon the shaft 552 engages in a notch in a vertical slide 556 and a spring pressed plunger 558 bearing against another arm 560 on the shaft 552 tends to rock the shaft in a direction to elevate the slide. When the hook 548 is disengaged by the tappet 540 striking the screw 542 the slide 556 is elevated. By this time the slide is at the right of a lug 562 which projects downwardly from the cross head 392. Mounted also upon the upper slide 482, and traveling therewith, is a controlling slide 564 one end of which engages a rocker arm 566 projecting downwardly from the shaft 514 and the other end of which carries a cross head 568 against which bear two springs 570. In the cross head is pivoted a dog 572, the weight of which is supported by a spring pressed plunger 574. When the slide 482 moves outwardly the dog 572 is depressed and passes idly beneath the lug 562.

As the slides 482, 486, which are still locked together, start to move inwardly, the nail is driven through the heel by the pin 258. By the time the nail is completely driven and the point of the pin 258 is flush with the surface of the plate 388 the dog 572 has engaged the outer face of the lug 562, causing the slide 564 to move outwardly relatively to the slide 482 against the tension of the springs 570 and rocking the shaft 514 so that the hook 516 is disengaged from the cross head 518, allowing the spring 522 to lift the locking dog 526 out of the notch 528 and disconnecting the slide 482 from the slide 486. At this time the inclined top face of the slide 556 has passed beneath the lug 562 and snapped up beside the left hand face of the lug, as viewed in Fig. 16, which is thus located between the slide 556 and the dog 572.

With the parts in these positions the inward movement of the slide 486 is interrupted before the face 502 engages the face 504 and this part of the mechanism remains stationary while the upward movement of the plunger 472 is completed, finishing the straightening of the toggle 454, 456, and applying the final pressure to the heel pile. The compression of the heel also clinches the point of the nail. The toggle being straightened, the plunger 472 and the bunter 474 are lowered and the unit 51, containing the heel under pressure, is moved along the track 380 until the roll 410 is out of engagement with the track section 478.

After the lug 562 has passed out from between the slide 556 and the dog 572 the inward movement of the slide 486 is completed the face 504 engaging the face 502 and carrying the upper slide 482 inward to its original position ready to receive the next unit 51. At the end of the inward movement of the slide 482 a projecting portion of the rocker arm 550 engages a stop screw 576, rocking the shaft 552 until the hook 548 engages said arm 550 holding the slide 556 depressed ready to pass beneath the lug 562 on the next unit 51 during the next outward movement of the slide 484.

The chain of units 51 thus progresses step by step in an approximately elliptical path around the machine, each unit coming to rest with the center of its toggle beneath a plunger 578 connected by a link 580 (see Fig. 4) to a lever 582 movable about a stationary pivot 584 in the frame of the machine. The opposite end of the lever 582 is connected by a rod 586 to a bell crank lever 588 movable about a stationary pivot 590 and connected by a cross link 592 to a rocker arm 594 keyed to a shaft 596 which carries another rocker arm 598 pivotally connected to the plunger 472. Thus, when the plunger 472 is elevated to straighten the toggle and apply pressure to a heel in a unit 51 at one side of the machine the plunger 578 descends and breaks the toggle in the unit at the opposite side of the machine, releasing the heel and allowing it to drop out. It will be apparent from an inspection of Fig. 3 that when the machine is in operation there will be at all times sixteen of the units 51 which contain heels under pressure, allowing sufficient time for the paste in each heel to set before the heel is released.

After the descent of the plunger 578 has caused the release of a heel from one of the press units 51 the plunger rises, as the plunger 472 descends, and in the further movement of the endless carrier the roll 410 passes up a curved portion 600 of the track 412 until, at the third station beyond that at which the heel was discharged from the unit 51, the lift impaling portion of the unit is again upright.

At the station at which the lift impaling portion of the unit reaches an upright position is located mechanism for restoring the impaling pin 258 and the stripper plate 388 to the positions illustrated in Fig. 8. To this end there is provided a vertically movable slide 602, as shown in Fig. 4, having an overhanging portion arranged to engage the cap 406 to depress the impaling pin, and a shoulder 604 arranged to engage the lug 562 to depress the stripper plate. The slide 602 is connected by a link 606 to a rock lever 608 actuated, through a connecting rod 610, by an arm 612 keyed upon the shaft 590. When the shaft 590 is rocked, therefore, the pressure toggle of one press unit is broken to release the heel contained therein, and the impaling pin and stripper plate of the third unit beyond are returned to lift receiving position.

For the purpose of applying paste to the lifts during the assembling process, a pasting mechanism is provided which is entirely automatic in its operation. A large bevel gear 614 is secured to the sprocket shaft 42, and inasmuch as this shaft is rotated very slowly as compared with the speed of the paste applying roll the gear 614 is, for the purpose of actuating the pasting mechanism, virtually stationary. For the sake of brevity and convenience in the subsequent description the said gear will be referred to as stationary, although it does, in fact, rotate intermittently at a very slow speed. Referring to Figs. 4, 21 and 22, meshed with the gear 614 is a bevel pinion 616 mounted on the same shaft with a gear 618 which is geared, through an idle gear 620, to a gear 622 secured to a shaft 624 having a bearing in a radial arm 626 carried by a sleeve 628 which surrounds the upright shaft 424 and is rotatable thereon. To the lower end of the sleeve 628 is secured a bevel gear 630 (shown in Figs. 5 and 6) which meshes with a similar gear 632 secured to and driven by the shaft 254. Inasmuch as the shaft 254 runs continuously when the machine is operating, the arm 626 moves continuously in a horizontal circle about the shaft 42 as a center. During this circular movement of the arm 626 the pinion 616 rolls upon the gear 614, driving the gearing 618, 620, 622 and the shaft 624.

The shaft 624 is connected by an Oldham coupling 634 to a shaft 636 having in its outer end a clutch member 638 which is yieldingly projected by a spring 640. A cooperating clutch member 642 is mounted upon the end of a shaft 644 to which is secured a gear 646. The gear 646 engages and drives an internal gear 648 which is secured to the paste applying roll 434.

The paste roll contains an internal bearing 650 which is mounted to rotate upon a journal 652 which in turn is adapted to oscillate in a vertical arc upon a segmental support 654. This oscillation of the paste roll in a vertical plane is for the purpose of permitting it to adapt itself to the inclined surface of a heel pile which results from including one or more wedge lifts in the pile. The face of the gear 648 is wide enough to permit this angular adjustment of the paste roll without unmeshing it from its driving gear 646.

The paste roll 434 rotates in a pot 656 having a hub 658 which fits in a bore in a head 659 carried at the end of the arm 626 and is held in position therein by a set screw 660 which is readily manipulated by a knob 662. This construction is such that by slackening the set screw 660 the paste pot 656 with its contents may be readily removed from the machine for cleaning. Paste is supplied to the pot 656 from a large reservoir or tank 664 supported by a rod 666 mounted in arms 668, 670 secured to the sleeve 628. The reservoir 664 is arranged to swing into and out of operative position around the rod 666. A pump 672 within the reservoir is operated by a gear 674 which meshes with a gear 676 secured to the bevel gear 614.

The pump 672 operates to pump paste from the reservoir out through the pipe 678 from which it is delivered into a receiving space 680 in the pot 656. A scraper 682 serves to regulate the thickness of the layer of paste upon the roll 434. When the level of the paste in the pot 656 becomes too high the paste overflows into a chamber 684 communicating by a conduit 686 with a pump 688 operated by a gear 690 which is in turn driven by a gear 692 secured to the shaft 636.

The discharge pipe of the pump 688 is shown at 694 and leads back to the reservoir 664 to which the surplus paste is returned.

The pasting mechanism so far described will operate to apply paste to the under surface of the bottom lift upon each of the impaling pins 258 but it is desirable that the outer face of the last lift of the heel pile be left dry, and means is, therefore, provided for preventing the application of paste to the under face of the lift which is impaled upon the pin 258 when the unit 51 is at the station where the last lift is applied to the heel pile.

The head 659 is mounted upon an upright plunger 696 which can slide vertically in a bearing 698 at the outer end of the arm 626 but is prevented from rotating in the bearing by a spline 700. The head 659 is normally maintained elevated by compression springs 702. A bell crank lever 704 pivoted at 706 in the arm 626 has one arm bearing upon an adjustable screw 708 threaded into the plunger 696 and the other end engaged in a notch formed in a slide 710 which carries a cam roll 712 pressed toward a stationary cam 714 by spring 716 and controlled by an adjustable stop nut 718. The arrangement is such that when the paste roll approaches the unit 51, to which the last lift of a heel pile has been applied, the roll 712 engages the cam 714, rocking the bell crank lever 704 and depressing the paste pot sufficiently to prevent the roll 434 from engaging the face of the lift which is thus left dry. The Oldham coupling 634 permits the paste pot to be raised and lowered without interfering with the transmission of power to the paste roll.

The nail supplying device 472 is driven, in proper time relation to the other mechanism, from the shaft 66 which has, at one end, a pinion 720 meshing with a gear 722 at the lower end of an upright shaft 724. The shaft 724 carries at its upper end a gear 726, meshing with a similar gear 728 on the end of a horizontal shaft 730 which extends across the machine and has, at its opposite end, a gear 732 which drives the nail supplying device.

Having described the mechanism of the machine in detail, a brief summary of its operation will now be given.

Assuming the magazines to be supplied with lifts, the nail supplying mechanism with nails, and the paste reservoir and pot with paste, the machine is in condition for continuous operation. The sprocket 46 is operated step by step to bring each of the units 51 successively into lift receiving relation to each of the magazines, the unit pausing in alinement with each magazine for a sufficient length of time to permit a lift to be transferred from the magazine, impaled upon the pin 258, and pasted. Inasmuch as the angular spacing of the receiving units about the outer edge of the sprocket 46 is the same as the angular spacing of the magazines, a series of units equal in number to the number of magazines is, at each pause, in lift receiving relation to the respective magazines and lifts are transferred from the magazines simultaneously to as many heel building units as there are magazines in use; that is to say, the heels are built in multiple, as many heels being simultaneously in the process of being assembled as there are lifts in a single heel, and a complete heel being produced at each step of the movement of the sprocket and the endless carrier consisting of the chain of units 51 moved thereby.

As each heel building unit stops in alinement with a lift magazine, the lift transferring and delivering mechanism appurtenant to that magazine is actuated to transfer the lift which has been delivered to it from the magazine to a position beneath the unit and then to elevate the lift and impale it upon the pin 258. The lift transferring and delivering mechanisms are then retracted, and the paste pot is moved in a circular path beneath the series of units upon the impaling pins of which lifts have just been impaled. The paste roll applies paste to the lower face of each of the side lifts, except the one adjacent to the last magazine of the series, this being the finishing lift of its heel and requiring no paste. After the application of the paste the endless carrier is advanced a step and the operations repeated.

As each heel building unit arrives at the nail loading station it receives a nail from the nail supplying mechanism 472 and as it leaves this station the impaling pin with the heel pile still impaled upon it is turned down into a horizontal position by the curved track section 436. When each unit reaches the third stop beyond the nail loading station the heel is subjected to a preliminary pressure, the impaling pin is withdrawn, the nail is driven, and the nailed heel is subjected to a final pressure under which it remains during the circuit of the unit 51 around the machine until it reaches the station where the pressure toggle is broken and the heel released. The impaling pin, with the heel upon it, is then returned to an upright position by the curved track section 600, and the impaling pin and stripper plate are returned to initial position ready to begin the building of a new heel in the unit.

In the event of failure to deliver a lift at the proper time from any magazine the automatic throw-out mechanism causes the succeeding magazines of the series to be thrown out of operative position so that no further lifts are delivered to the incomplete heel pile. As soon, however, as the magazine which first failed begins to function again the succeeding magazines automatically become operative.

Having described the invention, what is claimed as new and desired to be secured by Letters Patent is:

1. In a heel machine, the combination of a series of individual presses, and power operated means for assembling lifts in said presses to form heels therein.

2. In a heel machine, the combination of an endless series of individual heel presses, power operated mechanism for assembling lifts in said presses to form heels therein, and means for operating presses containing assembled heels to hold said heels under pressure while heels are being assembled in others of said presses.

3. In a heel machine, the combination of an endless series of individual heel presses, means for pasting and assembling lifts in said presses to form a heel in each press, means for operating said presses individually to subject the heels therein to pressure for a substantial time, and means for driving a nail through each heel before the pressure is released.

4. In a heel machine, the combination of a series of individual heel presses, a series of lift magazines, and mechanism for assembling lifts from said magazines directly into said presses.

5. In a heel machine, the combination of a series of individual heel presses, a series of lift magazines, means for effecting relative movement of said presses and magazines one past the other, and means for transferring lifts from successive magazines to each press.

6. In a heel machine, the combination of a series of individual heel presses, a series of lift magazines, means for effecting relative movement of said presses and magazines one past the other, and means for transferring lifts from each magazine to successive presses.

7. In a heel machine, the combination of an intermittently movable series of individual heel presses, and means acting upon the presses while they are stationary to cause them to apply pressure to heels contained therein.

8. In a heel machine, the combination of a movable series of individual heel presses, and means acting successively upon said presses when they are stationary to cause them to apply pressure to heels contained therein.

9. In a heel machine, the combination of an intermittently movable series of individual toggle heel presses, an actuator adjacent to which each press stops, and means for causing the actuator to operate the toggle of the adjacent press.

10. In a heel machine, the combination of a movable series of individual heel presses each having a pressure applying toggle, mechanism for moving said presses intermittently in a predetermined path, a movable toggle straightening device and a movable toggle breaker located at separated stations adjacent to said path, and means for operating said device and said breaker during pauses in the intermittent movement of the presses to straighten and break, respectively, the pressure toggles of presses adjacent to said stations.

11. In a heel machine, the combination of a plurality of sources of lift supply, a carrier movable successively into co-operative relation to said sources, an impaling tool mounted upon the carrier, and means for assembling lifts from said sources of supply upon the impaling tool.

12. In a heel machine, the combination of a heel building device movable to and from a heel assembling position, an impaling member mounted upon said device, means for impaling lifts upon said member in face to face relation to build a heel, and means for stripping the heel from the impaling member.

13. In a heel machine, the combination of a heel building device, an impaling member mounted upon said device, means for impaling lifts upon said member in face to face relation to build a heel, and means for applying paste to the face of a lift after it is impaled.

14. In a heel machine, the combination of a lift magazine, a heel building device, an impaling member mounted upon said device, means for transferring lifts from said magazine to a position in alinement with said impaling member, and means for moving an element of said transferring means toward the impaling member to impale a lift.

15. In a heel machine, the combination of a series of lift magazines, a series of heel building devices, an impaling member mounted upon each of the heel building devices, and a series of transferrers constructed and arranged to transfer lifts from the magazines to the heel building devices and to impale the lifts upon the respective impaling members of said heel building devices.

16. In a heel machine, the combination of a series of lift magazines, a series of heel building devices, means for transferring successive series of lifts from the magazines to said devices, and means for applying paste to each series of lifts after delivery to the heel building devices and prior to the delivery of the next series of lifts.

17. In a heel machine, the combination of a heel building device, an impaling member mounted upon said device, lift pasting mechanism, means for assembling a plurality of pasted lifts upon said impaling member, means for subjecting the assemblage to pressure, and means for removing the assemblage of lifts from the impaling member.

18. In a heel machine, the combination of a heel building device, an impaling member mounted upon said device, lift pasting mechanism, means for assembling a plurality of pasted lifts upon said impaling member, means for subjecting the assemblage to pressure, means for removing the assemblage of lifts from the impaling member, and means for inserting a fastening in the hole left by the impaling member.

19. In a heel machine, the combination of a heel building device, an impaling member mounted upon said device, means for impaling lifts upon said member in face to face relation to build a heel, means for applying paste to the faces of the lifts after they are impaled, and means for applying pressure to the heel while it is still impaled upon said member.

20. In a heel machine, the combination of a plurality of lift impaling units, means for assembling in each of said units a plurality of lifts to form a heel, and means for holding a heel assembled in one unit under pressure while another heel is being assembled in another unit.

21. In a heel machine, the combination of a plurality of heel building devices, each having a lift impaling member, assembling mechanism for forcing lifts one at a time upon said impaling member to build a heel, and a pasting device operating between successive operations of the assembling mechanism to paste the faces of successive lifts.

22. In a heel machine, the combination of a series of individual heel presses, each having a lift impaling member, means for impaling a series of lifts upon each impaling member to form a heel in each press, means for applying paste to the faces of the lifts, means for operating the presses individually to apply pressure to the assembled heels for a substantial period of time, and means for withdrawing the impaling member from each heel and driving a nail into the hole left by the impaling member while the heel is under pressure.

23. In a heel machine, the combination of a lift impaling member, means for assembling a pile of lifts upon said member to build a heel, means for applying pressure to the heel while it is still impaled upon said member, means for stripping the heel from the impaling member, and means for thereafter increasing the pressure upon the heel.

24. In a heel machine, the combination of a lift impaling member, means for pasting and assembling upon said member a plurality of lifts in face to face relation to build a heel, means for applying pressure to the heel while it is still impaled, means for withdrawing the impaling member from the heel, and means for thereafter increasing the pressure upon the heel.

25. In a heel machine, the combination of a lift impaling member, means for assembling a plurality of lifts upon said member in face to face relation to form a heel, means for applying pressure to the heel while it is still impaled, means for withdrawing the impaling member from the heel, means for driving a heel building nail in the hole left by the impaling member, and means for thereafter increasing the pressure upon the heel.

26. In a heel machine, a heel building device comprising a lift impaling member, mechanism for impaling a series of lifts upon said member to form a heel, means for withdrawing the impaling member from the heel, and means for again advancing the impaling member to drive a nail through the heel.

27. In a heel making machine, a combined heel assembling and pressing unit comprising a swinging lift receiving member upon which lifts may be assembled when said member is in one position, an abutment arranged to be engaged by the assembled heel when said member is swung to another position, and mechanism for effecting relative approaching movement of said member and abutment to subject the heel to pressure in the last named position.

28. In a heel making machine, a heel assembling and pressing unit comprising a lift receiving member movable from an upright position in which lifts may be assembled upon it to a horizontal position, an abutment located adjacent to the heel when the latter is in said horizontal position, and toggle mechanism for moving the abutment toward the supporting member to subject the heel to pressure.

29. In a heel making machine, the combination of a bodily movable series of individual heel building and pressing units, each comprising a lift receiving member movable, independently of the bodily movement of the unit, from a lift receiving position to a heel pressing position, means for applying pressure to a heel contained in said unit when in pressing position, and means operating automatically to move the lift receiving member from lift receiving position to pressing position at a predetermined stage in the bodily movement of the unit.

30. In a heel machine, the combination of a movable series of individual heel building and pressing units each of which is independently movable from an upright lift assembling position to a horizontal pressure applying position, means for moving the series in a predetermined, endless path, and a stationary cam track engaging an element of each unit to move the latter from upright to horizontal position as the movement of the series progresses.

31. In a heel building machine, the combination of a series of lift magazines, mechanism for delivering lifts from the magazines in sequential order, and means, operating in the event of any failure to deliver a lift from one magazine, for preventing the delivery of lifts from the succeeding magazines of the series.

32. In a heel building machine, the combination of a series of lift magazines, a receiver movable past said series of magazines, means for transferring lifts from successive magazines to the receiver, and means, operating in the event of any failure to transfer a lift from any magazine to the receiver at the proper time, to prevent the transfer of lifts from succeeding magazines of the series.

33. In a heel building machine, the combination of a series of lift magazines, a series of receivers movable past said magazines in succession, means for transferring lifts from the successive magazines to each receiver, and means, operating in the event of any failure to transfer a lift from any magazine to any receiver at the proper time, to prevent the transfer of lifts from succeeding magazines of the series to that receiver.

34. In a heel building machine, the combination of a series of lift magazines, a series of receivers movable past said magazines in succession, means for transferring lifts from the successive magazines to each receiver, and means, operating in the event of failure to transfer a lift from any magazine to any receiver at the proper time, to prevent the transfer of lifts from succeeding magazines of the series to that receiver only.

35. In a heel machine, the combination of a series of lift magazines, a receiver movable past said series of magazines, means for transferring lifts from successive magazines to the receiver, and means controlled by the transferring means for preventing the delivery of lifts from succeeding magazines of the series when the transferring means fails to receive a lift from any magazine of the series.

36. In a heel machine, the combination of a receiver, a series of lift magazines, a corresponding series of lift transferrers, means for effecting relative movement between the receiver and the magazines to cause the receiver and successive magazines to assume co-operative relation, means for actuating successive transferrers when the receiver is in co-operative relation to their respective magazines, and means controlled by the transferrers during their transferring movements for preventing the delivery of lifts from succeeding magazines to the respective transferrers in the event that any transferrer of the series fails to receive a lift from its respective magazine.

37. In a heel machine, the combination of a series of lift magazines, a receiver, means for transferring lifts from successive magazines to the receiver, means for delivering lifts from the magazines to the transferring means, a lift engaging element on the transferring means, and connections between said lift engaging element and succeeding magazines of the series constructed and arranged to throw out said succeeding magazines when said lift engaging element does not engage a lift during the operation of the transferring means.

38. In a heel machine the combination of a series of lift magazines each of which is movable from a normal, lift delivering position to an inoperative position, mechanism co-operating with each magazine for delivering lifts singly therefrom when the magazines are in normal position, and means for moving a succeeding magazine of the series to a position where the lift delivering mechanism is inoperative when the delivering mechanism fails to deliver a lift from a preceding magazine.

39. In a heel machine, the combination of a series of sources of lift supply, a receiver, means for effecting relative movement between said sources of lift supply and said receiver to position the receiver and the sources of lift supply successively in adjacent relation, means for causing lifts to be transferred from said sources of supply in succession to the receiver, and means, operating in the event of any failure to transfer a lift from any one of said sources of supply to the receiver, to prevent the transfer of lifts to the receiver from succeeding sources of supply.

40. In a heel machine, the combination of a receiver upon which lifts are assembled in succession to build a heel, a source of lift supply, a transferrer movable from said source of supply to a position in alinement with the receiver, means for moving the transferrer from said position to the receiver, and means for preventing the movement of the transferrer to the receiver if there is no lift in the transferrer.

41. In a heel machine, the combination of a receiver upon which lifts are assembled in succession to build a heel, a source of lift supply, a transferrer movable from said source of supply to a position in alinement with the receiver, means for moving the transferrer from said position to the receiver to deliver a lift thereto, means for pasting the face of a lift after it is delivered to the receiver, and means for preventing movement of the transferrer to the face of a pasted lift if there is no lift in the transferrer.

42. That method of making lift heels which comprises assembling a plurality of lifts, subjecting the assemblage to pressure, driving a nail through the lifts, and then increasing the pressure upon the assemblage.

43. That method of making lift heels which comprises assembling a plurality of pasted lifts upon an impaling tool, subjecting the assemblage to pressure, removing the assemblage of lifts under pressure from the tool, and inserting a fastening in the hole left by the tool.

44. That method of making lift heels which comprises assembling a plurality of lifts upon an impaling tool, subjecting the assemblage to pressure, removing the assemblage of lifts from the tool while under pressure, and then increasing the pressure.

45. That method of making lift heels which comprises assembling a plurality of pasted lifts upon an impaling tool, subjecting the assemblage to pressure, removing the assemblage of lifts from the tool, and maintaining the assemblage under pressure until the paste has set.

46. That method of making lift heels which comprises assembling a plurality of pasted lifts upon an impaling tool, subjecting the assemblage to pressure, removing the assemblage from the tool while under pressure, driving a nail in the hole left by the tool, and then increasing the pressure and maintaining it until the paste has set.

47. That method of making lift heels which comprises assembling a plurality of lifts upon an impaling tool, removing the assemblage of lifts from the tool and utilizing the tool to insert a fastening in the hole left by the tool.

48. That method of making pasted lift heels which comprises assembling a plurality of pasted lifts, subjecting the assemblage to pressure, driving a nail through the lifts, and then increasing the pressure and maintaining it until the paste has set.

In testimony whereof I have signed my name to this specification.

FRED ASHWORTH.